United States Patent
Kuchi et al.

(10) Patent No.: US 11,558,231 B2
(45) Date of Patent: *Jan. 17, 2023

(54) METHODS AND SYSTEMS FOR GENERATING A LOW PEAK-TO-AVERAGE POWER RATIO (PAPR) DATA AND REFERENCE SIGNAL

(71) Applicant: WISIG NETWORKS PRIVATE LIMITED, Telangana (IN)

(72) Inventors: Kiran Kumar Kuchi, Hyderabad (IN); Saidhiraj Amuru, Hyderabad (IN); Sibgath Ali Khan Makandar, Sangareddy (IN)

(73) Assignee: WISIG NETWORKS PRIVATE LTD

( * ) Notice: Subject to any disclaimer, the term of this patent is extended or adjusted under 35 U.S.C. 154(b) by 0 days.

This patent is subject to a terminal disclaimer.

(21) Appl. No.: 17/475,412

(22) Filed: Sep. 15, 2021

(65) Prior Publication Data

US 2022/0052893 A1 Feb. 17, 2022

Related U.S. Application Data

(63) Continuation of application No. 16/816,394, filed on Mar. 12, 2020, now Pat. No. 11,153,141.

(30) Foreign Application Priority Data

Mar. 15, 2019 (IN) .......................... IN201941010123
Apr. 9, 2019 (IN) .......................... IN201941014203

(Continued)

(51) Int. Cl.
*H04L 27/26* (2006.01)
*H04L 5/00* (2006.01)

(52) U.S. Cl.
CPC ........ *H04L 27/2613* (2013.01); *H04L 5/0048* (2013.01); *H04L 27/2636* (2013.01); *H04L 27/26412* (2021.01)

(58) Field of Classification Search
CPC .............. H04L 5/0048; H04L 27/2626; H04L 27/2613

(Continued)

(56) References Cited

U.S. PATENT DOCUMENTS 11,153,141 B2 * 10/2021 Kuchi ............... H04L 25/03834
2020/0146094 A1 * 5/2020 Wu ........................ H04W 4/70

* cited by examiner

*Primary Examiner* — Emmanuel Bayard
(74) *Attorney, Agent, or Firm* — McAndrews Held & Malloy, Ltd.

(57) ABSTRACT

Embodiments of the present disclosure relate to systems and methods to generate a signal in a communication network. The method comprises filtering a discrete Fourier transform spread orthogonal frequency division multiplexing (DFT-s-OFDM) data signal, and one of a DFT-S-OFDM and orthogonal frequency division multiplexing (OFDM) reference signal (RS) using a data filter and a RS filter respectively, to produce filtered data signal and filtered RS. The RS filter has one to one relationship with the data filter. Thereafter, port mapping the filtered RS to a corresponding port assigned to the transmitter to obtain port mapped filtered RS, wherein the port mapped filtered RS comprises a first subset of non-zero locations comprising of the filtered RS values and a second subset of zero locations comprising of zero values.

20 Claims, 22 Drawing Sheets

(30) Foreign Application Priority Data

Dec. 1, 2019 (IN) .......................... IN201941049361
Feb. 15, 2020 (IN) .......................... IN202041006613

(58) Field of Classification Search
USPC ................................ 375/260, 267, 316, 350
See application file for complete search history.

S(k) Frequency domain DMRS sequence

R(k) Frequency domain RS filter

METHODS AND SYSTEMS FOR GENERATING A LOW PEAK-TO-AVERAGE POWER RATIO (PAPR) DATA AND REFERENCE SIGNAL

CROSS-REFERENCE TO RELATED APPLICATIONS

This application is a continuation of U.S. patent application Ser. No. 16/816,394 filed Mar. 12, 2020, now U.S. Pat. No. 11,153,141), which claims priority from the Indian Provisional Patent Application Numbers i) 201941010123, filed on Mar. 15, 2019; ii) 201941014203 filed on Apr. 9, 2019; iii) 201941049361 filed on Dec. 1, 2019 and iv) 202041006613 filed on Feb. 15, 2020. The aforementioned documents are hereby incorporated by reference in their entirety.

TECHNICAL FIELD

Embodiments of the present disclosure are related, in general to communication, but exclusively relate to methods and systems for generating an uplink signal.

BACKGROUND

Uplink of any cellular network is typically limited by power constraints. If OFDM is used for transmission, then due to high PAPR of this waveform, the power being transmitted must be backed off by some value to reduce and avoid nonlinearities. However, this will reduce coverage of this waveform based transmission and cell edge users cannot send signals properly TO avoid this, a new waveform called DFT-s-OFDM waveform was used in LTE and also in 5G. Typically modulations used in this are QPSK, 16-QAM etc. However, the PAPR of these waveforms are around 4 dB value. This is still high. To further reduce, a new modulation scheme was introduced in 5G namely pi/2 BPSK. This has reduced the PAPR to about 3.5-4.0 dB.

To reduce this further, a technique called spectrum shaping or filtering was introduced. This brings down the PAPR to 1-2.0 dB with appropriate selection of "filtering" (this type of filtering is different from conventional filters can be viewed as a form of data precoding in time or frequency domain) and even allows signal transmission near power amplifier (PA) saturation without significant reduction in receiver performance. Similar filtering operation must be performed for the pilots or reference signals which are used for coherent demodulation of the data. For reference signals (RS), any sequence can be used and when passed through spectrum shaping, but through an appropriately selected sequence, the RS PAPR can made low.

The pi/2-BPSK modulation scheme, when transmitted using Discrete Fourier transform-spread orthogonal frequency-division multiplexing (DFT-s-OFDM Waveform), offers low PAPR when compared to higher order modulation schemes including QPSK. Hence pi/2-BPSK modulation scheme is employed to carry the uplink data on physical uplink shared channel (PUSCH) and physical uplink control channel (PUCCH) in the 3GPP 5G NR. The demodulation reference signals (DMRS) are employed for coherent demodulation of the received data. The PAPR of both DMRS and data has to be similar and low in order to potentially allow for larger coverage.

When multiple users send signals, their reference signals must be sent in orthogonal manner so they don't interfere. For this purpose, antenna port (port) concept was introduced. In the case of multiple stream transmissions using DFT-s-OFDM waveform, where multiple streams, or multiple users can be configured simultaneously to transmit multiple streams depending on the channel conditions. In order to support these multiple-stream transmission, multiple DMRS sequences are required, one for each stream (streams are also called as layers). This is achieved by introducing the concept of baseband antenna port. Antenna port is a logical entity which is distinct from a physical antenna and is associated with a specific set of reference signal. Each data stream is associated with one antenna port irrespective of number of physical antennas. So, first for transmission, filtering (or spectrum shaping) is performed and then the resulting reference signals will be put on the proper locations in orthogonal manner i.e., based on port assigned to them.

Even for the case where single data stream is transmitted using single or multiple antennas, the 5G NR standard mandates certain method where PUSCH data is transmitted using a single layer where all allocated subcarrier are fully transmitted with the given data whereas the PUSCH RS that is associated with the PUSCH data is required to transmit RS on certain subcarrier locations (specifically even or odd subcarrier locations) that are associated with an antenna port or port. In this case, there is no physical antenna port associated with the RS or data but the specification defines a logical antenna port or port that creates two possible RS subcarrier mapping schemes where only a portion of the subcarriers are used for RS and the portion used is decided by the allocated port.

When multiple-stream transmissions are supported or even for the case of single layer transmission with multiple antenna ports (or ports), the current 3GPP specifications does not specify the exact mechanism of spectrum shaping implementation for the data and DMRS sequences. For instance, with P users, each with one layer is configured to transmit simultaneously, a M/P length DMRS sequence will be transmitted on one of the P ports. In such case, spectrum shaping has to align between data and DMRS transmissions so that overall channel can be estimated precisely, which otherwise may result in imperfect receiver implementations (resulting in the loss of data exchanged). In addition to this, if the transmitter architecture to generate the DMRS waveform is not carefully designed, then it is also possible that the same DMRS sequence when mapped to two different baseband antenna ports will have non identical PAPR, auto and/or cross-correlation properties. This eventually impacts the channel estimation performance and, subsequently, data demodulation. In the following we disclose transmitter architectures that generate the low PAPR DMRS waveform associated with low PAPR PUSCH data that results in identical channel estimation performance on all the baseband antenna ports, as well as very low PAPR.

There can be multiple non obvious ways to choose and apply data and RS filters on data and RS respectively. Several of these options are covered in this disclosure. Each of these options will be associated with an accompanying receiver design as each method needs to account for channel estimation and data equalization as per the filter used on each of data and RS. The methods disclose where different relations between data and RS filters are employed that not only result in low PAPR for data and RS but also avoid detection losses at the receiver. In some cases, data may be filtered and RS may not be, both may be filtered, or only RS may be filtered etc. All these cases can be covered by using various methods wherein filters may be explicitly specified.

The following cases may arise, when both data and RS filter are explicitly known and exchanged between the transmitter and receiver, or only one of the data filter or RS filter is known then the relation between data spectrum shaping filter and RS spectrum shaping filter has to be specified, else the receiver will experience a performance loss, which means that the other filter must be calculated/inferred from the known filter. This calculation may be known a priori and may be such as sub-sampling of one filter's coefficients to get other filter or interpolation of one filter's coefficients to get another filter's coefficients or rotation of the one filter coefficients to get another filter coefficients or some such mathematical operations. Further, this helps in case when the shaping filter is not explicitly defined by the base station to the user. In this example, the receiver estimates combined channel and shaping filter response on the DMRS and then use the estimated combined channel and shaping filter response for coherently demodulating the data symbols.

SUMMARY

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

In one aspect of the present disclosure a method of generating a signal in a communication network is disclosed. The method comprises filtering, by a transmitter, a discrete Fourier transform spread orthogonal frequency division multiplexing (DFT-s-OFDM) data signal, and one of a DFT-S-OFDM and orthogonal frequency division multiplexing (OFDM) reference signal (RS) using a data filter and a RS filter respectively, to produce filtered data signal and filtered RS. The RS filter has one to one relationship with the data filter. Also, the method comprises port mapping the filtered RS to a corresponding port assigned to the transmitter to obtain port mapped filtered RS, wherein the port mapped filtered RS comprises a first subset of non-zero locations comprising of the filtered RS values and a second subset of zero locations comprising of zero values.

In another aspect of the present disclosure method for generating a waveform in a communication network is disclosed. The method comprising rotating, by a transmitter, at least one modulated data and at least one modulated reference sequence (RS) to produce rotated modulated data and rotated modulated RS. Also, the method comprises precoding the rotated modulated data and the rotated modulated RS using a data filter and a RS filter respectively, to produce a precoded data and precoded RS. Further, the method comprises transforming the precoded data and the precoded RS using Discrete Fourier Transform (DFT) to generate transformed precoded data and transformed precoded RS; and port mapping the transformed precoded RS to a corresponding port of the transmitter to obtain port mapped transformed RS. Furthermore, the method comprises mapping the port mapped transformed RS and the transformed precoded data using a plurality of subcarriers to generate a sub-carrier mapped output and generating a waveform by performing Orthogonal Frequency Division Multiplexing (OFDM) modulation on the sub-carrier mapped output.

In yet another aspect of the present disclosure a method of generating a waveform in a communication network is disclosed. The method comprises rotating, by a transmitter, at least one modulated data and at least one modulated reference sequence (RS) to produce rotated modulated data and rotated modulated RS. Also, the method comprises transforming the rotated modulated data and the rotated modulated RS using Discrete Fourier Transform (DFT) to generate transformed rotated modulated data and transformed rotated modulated RS. Further, the method comprises filtering the transformed rotated modulated RS and the transformed rotated modulated data using a RS filter and data filter to produce a filtered RS and filtered data respectively; and port mapping, by the transmitter, the filtered RS to corresponding ports of the transmitter to obtain port mapped RS output. Furthermore, the method comprises mapping the port mapped RS output and filtered data using a plurality of subcarriers to generate a sub-carrier mapped output; and generating a waveform by performing Orthogonal Frequency Division Multiplexing (OFDM) modulation of the sub-carrier mapped output.

In yet another aspect of the present disclosure a method of generating a waveform in a communication network is disclosed. The method comprising rotating, by a transmitter, at least one modulated data and at least one modulated reference sequence (RS) to produce rotated modulated data and rotated modulated RS. Also, the method comprises performing repetition operation on the rotated modulated RS to obtain a M-length rotated modulated RS, and precoding the rotated modulated data and the M-length rotated modulated RS using a data filter and a RS filter respectively, to produce a precoded data and precoded RS. Further, the method comprises transforming the precoded data and the precoded RS using M-point Discrete Fourier Transform (DFT) to generate transformed data and transformed RS; and performing circular rotation on the transformed RS by p samples that correspond to a specific port p out of the total ports P to obtain port mapped transformed output. Furthermore, the method comprises mapping the port mapped transformed output using a plurality of subcarriers to generate a sub-carrier mapped output; and generating a waveform by performing Orthogonal Frequency Division Multiplexing (OFDM) modulation on the sub-carrier mapped output.

In another aspect of the present disclosure a method of generating a waveform in a communication network is disclosed. The method comprising rotating, by a transmitter, at least one modulated data and at least one modulated reference sequence (RS) to produce rotated modulated data and rotated modulated RS. The method comprises performing repetition operation on the rotated modulated RS to obtain a M-length rotated modulated RS; and transforming the rotated modulated data and the M-length rotated modulated RS using M-point Discrete Fourier Transform (DFT) to generate transformed data and transformed RS. Further, the method comprises filtering the transformed modulated data and the transformed modulated RS using a RS filter and a data filter respectively, to produce a precoded data and precoded RS. The data filter is having one to one correspondence with the RS filter. Furthermore, the method comprises performing circular rotation on the filtered transformed RS by a port number p samples to obtain port mapped transformed output, and mapping the port mapped transformed output and filtered data using a plurality of subcarriers to generate a sub-carrier mapped output. Thereafter, the method comprises generating a waveform by performing Orthogonal Frequency Division Multiplexing (OFDM) modulation on the sub-carrier mapped output.

In another aspect of the present disclosure a method of generating a waveform in a communication network is disclosed. The method comprising rotating, by a transmitter, at least one modulated data and at least one modulated reference sequence (RS) to produce rotated modulated data and rotated modulated RS. Also, the method comprises performing repetition operation on the rotated modulated RS to obtain a M-length rotated modulated RS, and performing circular rotation on the M-length rotated modulated RS by multiplying with $$e^{\frac{j2\pi pn}{M}},$$

where p is the port number and n is the sample number to obtain port mapped modulated RS. Further, the method comprises transforming the rotated modulated data and the port mapped modulated RS using M-point Discrete Fourier Transform (DFT) to generate transformed data and transformed RS; and filtering the transformed data and the transformed RS using a RS filter and a data filter respectively, to produce a filtered transformed data and filtered transformed RS. Furthermore, the method comprises mapping the filtered transformed data and filtered transformed RS using a plurality of subcarriers to generate a sub-carrier mapped output; and generating a waveform by performing Orthogonal Frequency Division Multiplexing (OFDM) modulation on the sub-carrier mapped output.

In another aspect of the present disclosure a method of detecting received waveform in a communication network is disclosed. The method comprising converting, by a receiver, the received signal into a digital signal, said received signal comprises at least one of data signal, reference signal (RS) and characteristics associated with a plurality of filters, said plurality of filters are data filter and RS filter. Also, the method comprises transforming the digital signal in to a frequency domain signal using a Fast Fourier Transform (FFT), and de-mapping, by the receiver, the transformed signal to one or more sub-carriers to obtain a de-mapped transformed signal. Further, the method comprises equalizing the de-mapped transformed sequence using estimated channel to generate equalized data sequence, wherein the estimated channel is obtained using one of the characteristics associated with the RS filter if explicitly indicated, and using the data filter and the RS filter if explicitly indicated.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

Figure 16A:
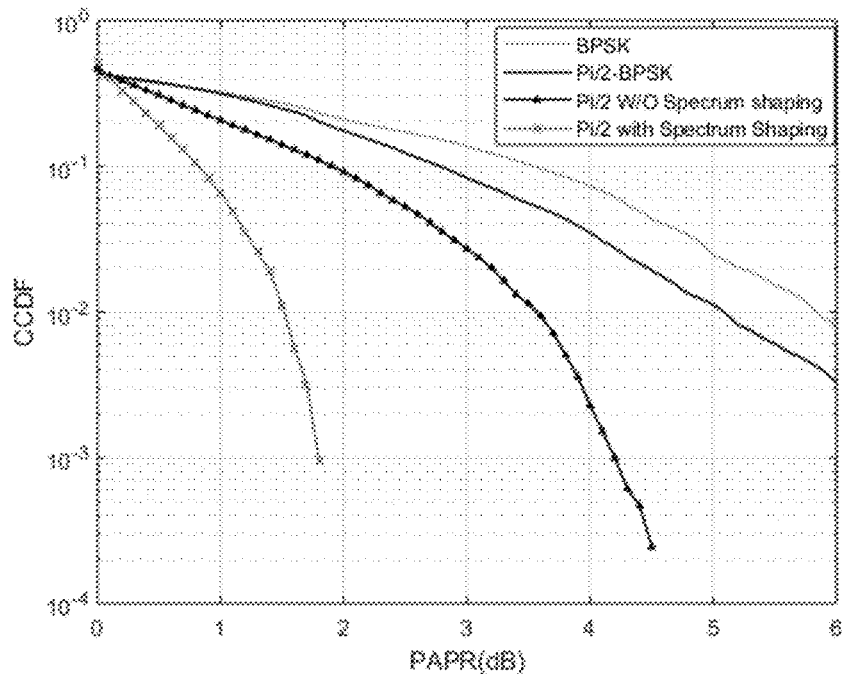
Figure 16B:
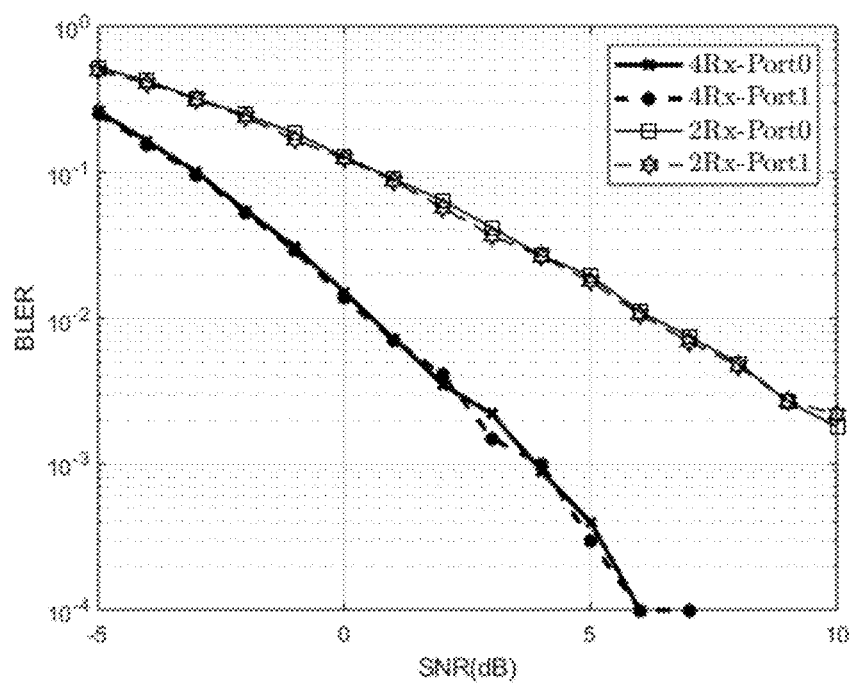
Figure 17:
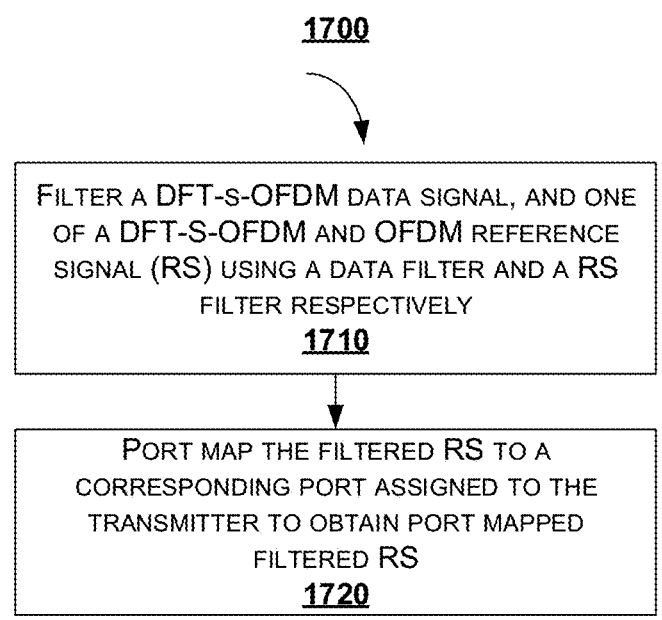
Figure 18:
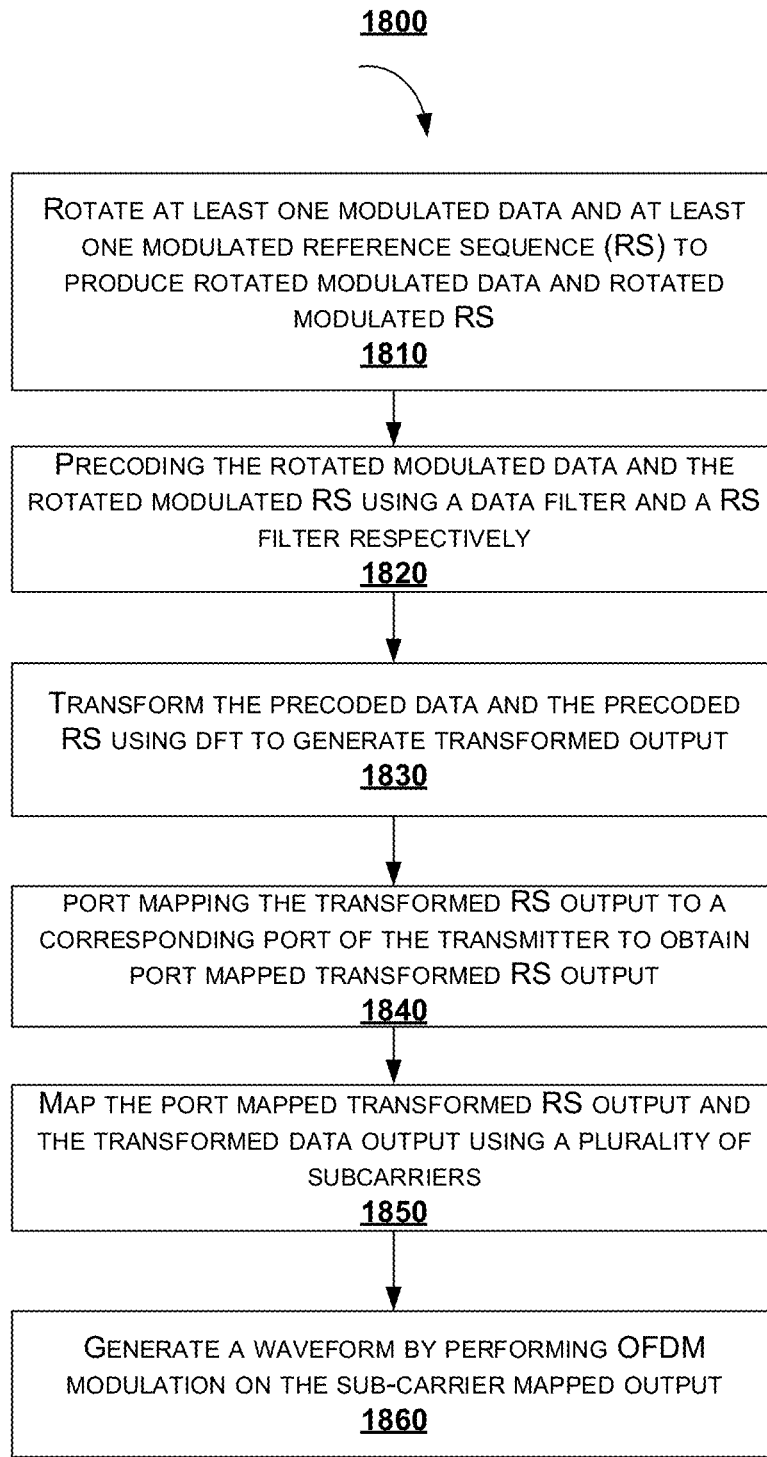
Figure 19:
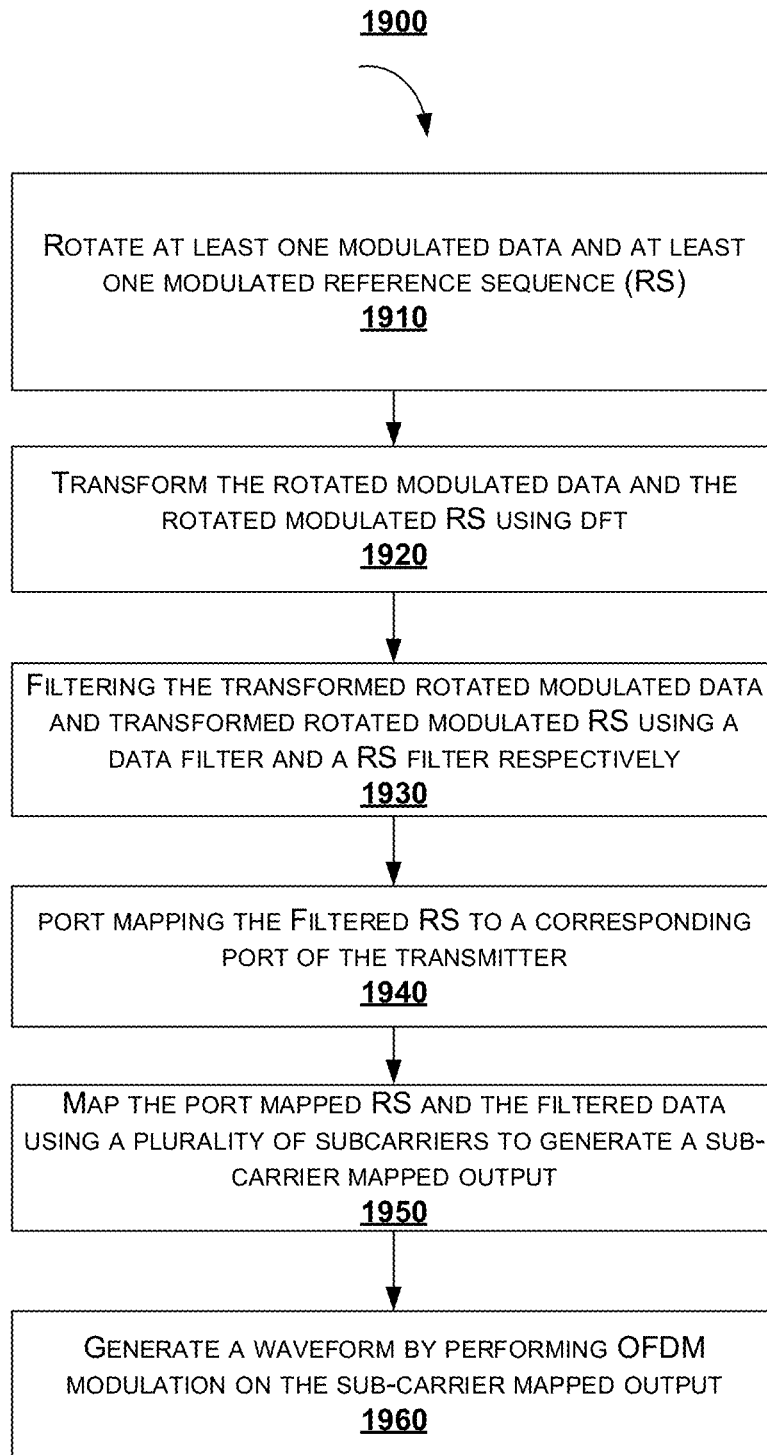
Figure 20:
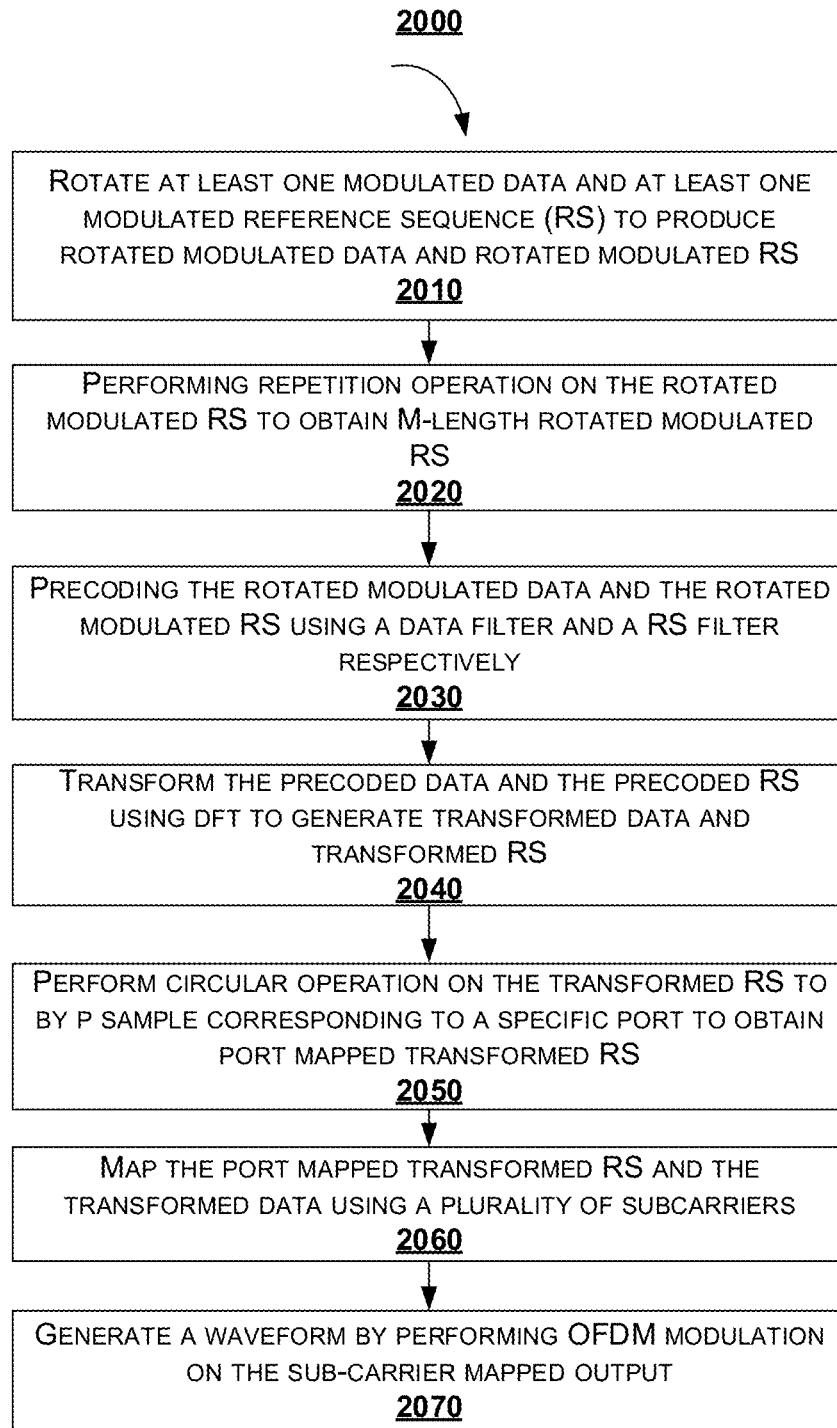
Figure 21:
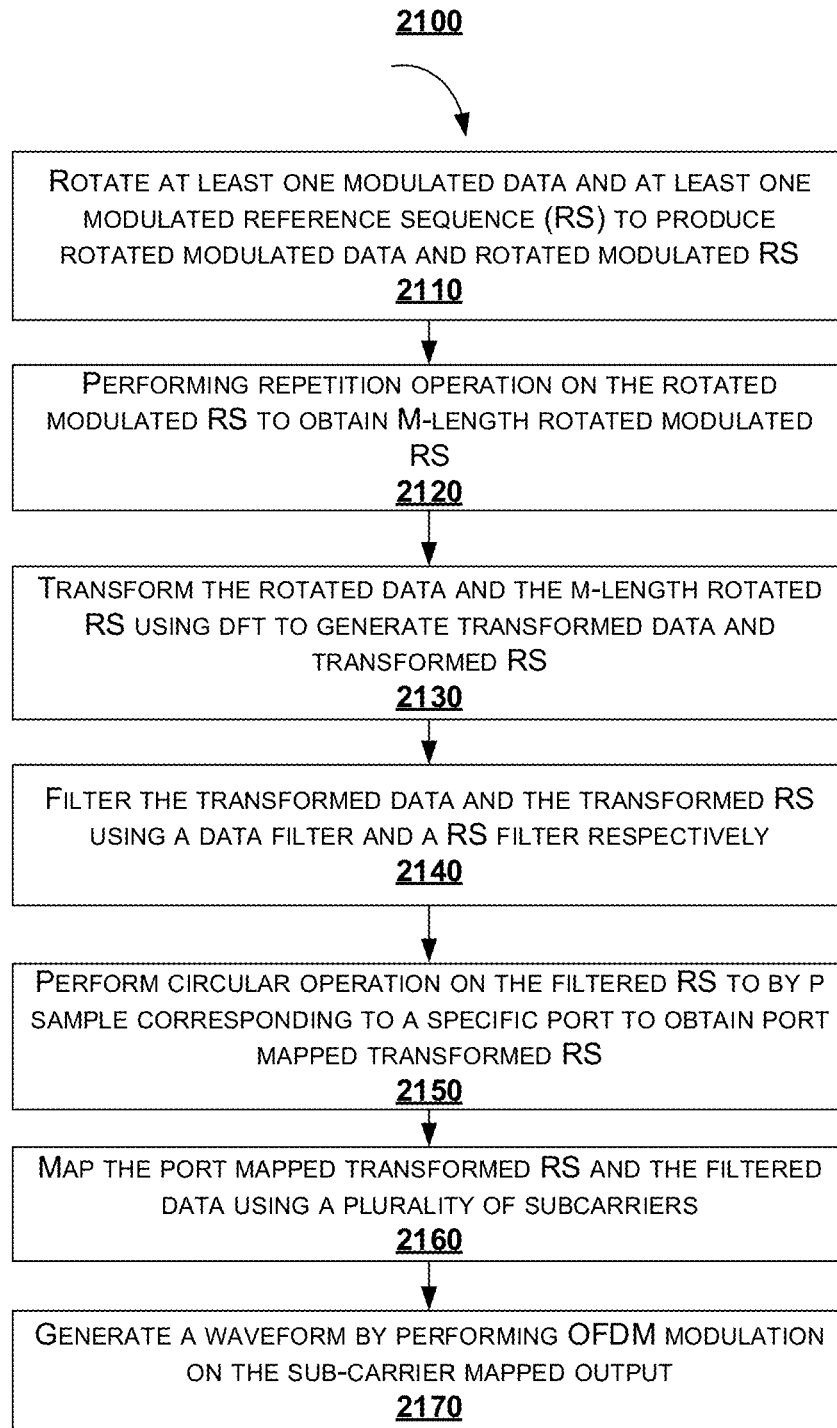
Figure 22:
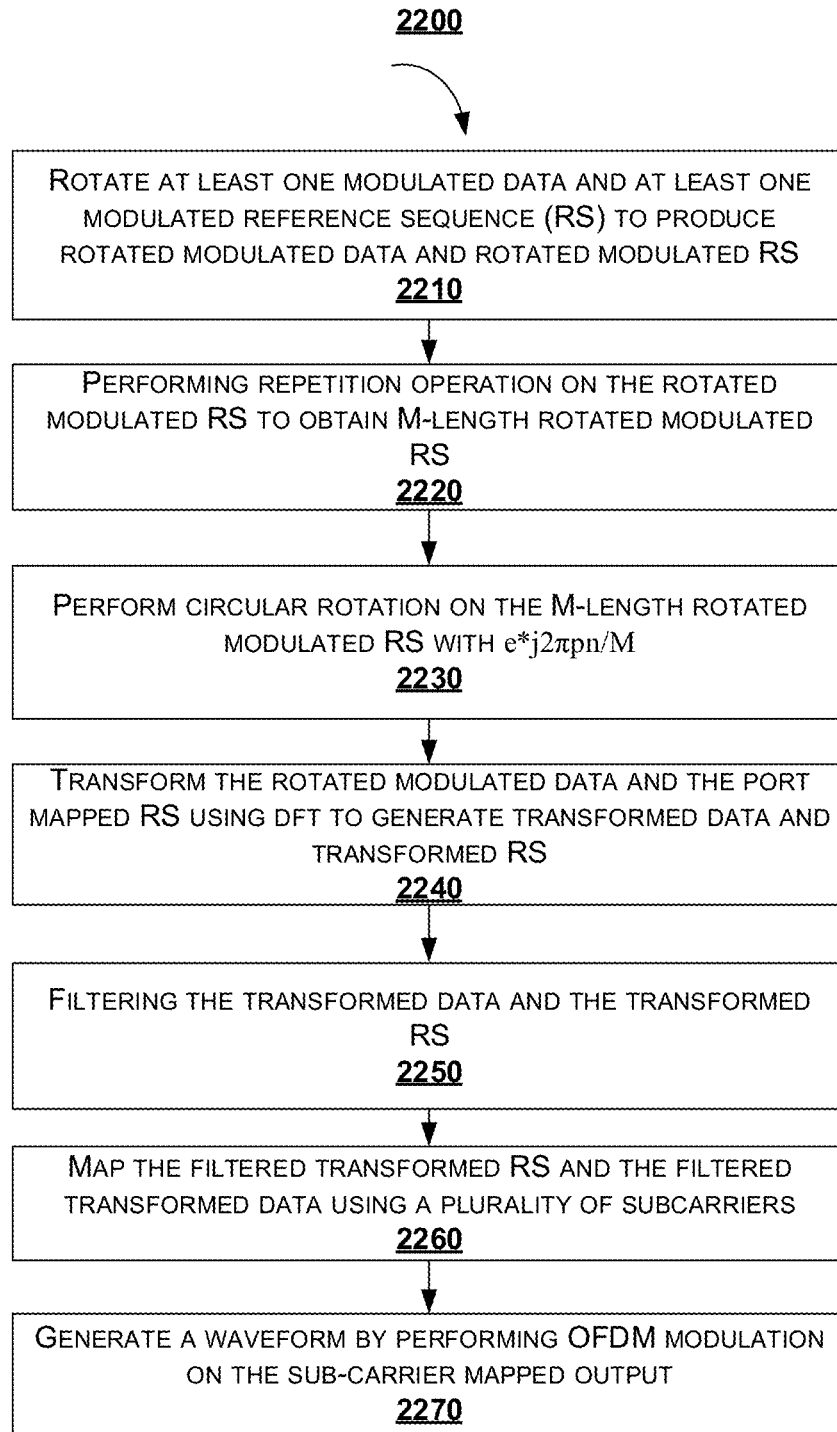

FIGS. 16A and 16B plots illustrating results of the CCDF or PAPR values and BLER values respectively, in accordance with another example embodiment of the present disclosure;

FIG. 17 shows a flowchart illustrating a method of generating a signal by a transmitter, in accordance with some embodiments of the present disclosure;

FIG. 18 shows a flowchart illustrating a method of generating waveform by a transmitter, in accordance with an alternative embodiments of the present disclosure;

FIG. 19 shows a flowchart illustrating a method of generating waveform by a transmitter, in accordance with yet another embodiments of the present disclosure;

FIG. 20 shows a flowchart illustrating a method of generating waveform by a transmitter, in accordance with an alternative embodiments of the present disclosure;

FIG. 21 shows a flowchart illustrating a method of generating waveform by a transmitter, in accordance with yet another embodiments of the present disclosure; and FIG. 22 shows a flowchart illustrating a method of generating waveform by a transmitter, in accordance with an alternative embodiments of the present disclosure.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

Embodiments of the present disclosure relates to Pi/2 BPSK reference signal (RS) comb. Also, embodiments of the present disclosure relate to generation of low peak-to-average power ratio (PAPR) sequences which may be employed as demodulation reference signal (DMRS) for coherent detection in uplink Discrete Fourier Transform-Spread-Orthogonal frequency-division multiplexing (DFT-s-OFDM). Referring to 3GPP NR Rel-15, $\pi/2$ BPSK modulation with spectrum shaping and ZC/QPSK sequences as DMRS is supported for the uplink DFT-s-OFDM. The PAPR of ZC/QPSK sequences is found to be relatively higher compared to $\pi/2$ BPSK modulated data. However, both options are considered for practical implementation.

Figure 1:
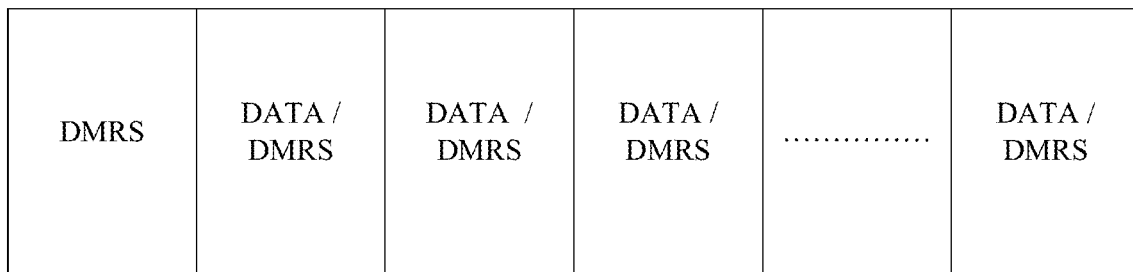
FIG. 1 shows an illustration of data demodulation reference signal (DMRS) multiplexing in terms of Orthogonal frequency-division multiplexing (OFDM) symbols.

FIG. 1 shows an illustration of data demodulation reference signal (DMRS) multiplexing in terms of Orthogonal frequency-division multiplexing (OFDM) symbols. The general structure of DMRS and data multiplexing across time in is shown in FIG. 1. Channel estimation is performed using the DMRS symbols followed with channel equalization on data symbols to retrieve back the transmitted data.

As shown in FIG. 1, each block represents an OFDM symbol. In some symbols, data and DMRS may be multiplexed in frequency domain. In some symbols, only DMRS may be sent, and in some other symbols only data may be sent.

One embodiment of the present disclosure is structure of DMRS symbol. In NR uplink, DMRS symbols don't have contiguous resource element (RE) or subcarrier allocations but may have a comb like structure i.e. distributed allocation. That is every alternate RE will be contained DMRS or DMRS may possibly contained on every 'P' tones, where P is at least one of 2, 3, 4, and the like as shown in FIG. 2.

Figure 2A:
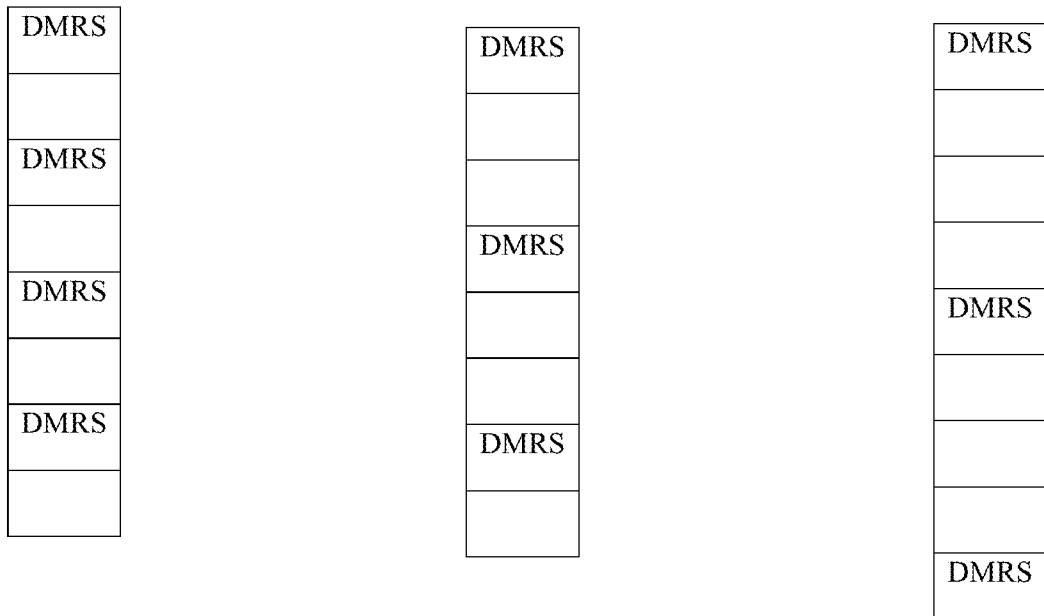
FIG. 2A shows an illustration of DMRS resource element (RE) allocations possibilities given by the comb parameter "P"
Figure 2B:
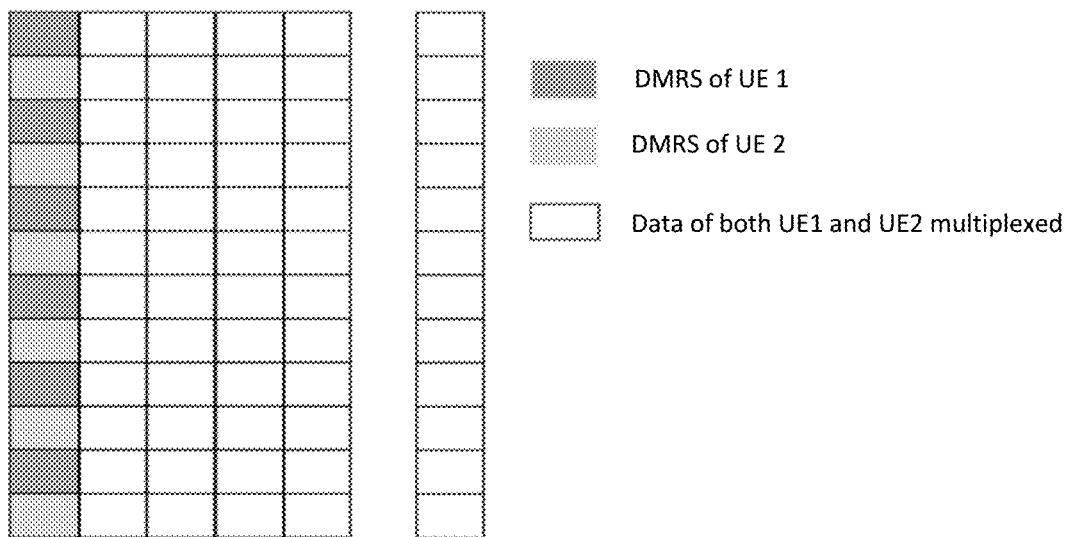
FIG. 2B shows an illustration of multiplexed DMRS for a plurality of users.

FIG. 2A shows an illustration of DMRS resource element (RE) allocations possibilities given by the comb parameter "P". FIG. 2B shows an illustration of multiplexed DMRS for a plurality of users.

The alternate DMRS-1 and 2, may be given to different antenna ports of same user or different users or to different cells. This configuration is performed by the base station and is indicated by higher layer parameters to the users.

As shown in FIGS. 2A-2B, a particular configuration of DMRS and Data multiplexing across OFDM symbols where P=2 and with one frontloaded and one additional DMRS symbol. In each case, the length of the DMRS sequence is dependent on the frequency of allocation of the data. That is, if the length of the data is N, then the length of DMRS sequence is either N, or N/2 or N/3 or N/4 or N/P depending on the number of port or antenna ports used or configured by the base station. The antenna port is a logical entity which is distinct from a physical antenna and is associated with a specific set of reference signal. Each data stream is associated with one antenna port irrespective of number of physical antennas.

In an embodiment, pi/2 BPSK modulation may be used to lower PAPR value in the transmitted data and enhance the signal coverage. A spectrum shaping filter may be used to achieve low PAPR The spectrum shaping filter is applied to both data and DMRS, so that both the data and DMRS achieve at least one of low PAPR values, power reduction and enhance coverage. In an embodiment, two filters are used, i.e. data filter for filtering data and RS filter for filtering reference signal. In an embodiment, both the data filter and the RS filter are explicitly known and information about the same is exchanged between the transmitter and receiver. In another embodiment, only one of the data filter and the RS filter is known, which means that the other filter must be calculated or inferred from the known filter. To obtain the unknown filter, one of the methods or operations is used such as, but not limited to sub-sampling of one filter's coefficients to get other filter, interpolation of one filter's coefficients to get another filter's coefficients, rotation of the one filter coefficients to get other filter coefficients, or some such mathematical operations may be used. Further, when the shaping filter is not explicitly defined by the base station to the user, using one of the methods the unknown filter may be calculated. For example, the receiver estimates combined channel and shaping filter response on the RS, for example DMRS and then use the estimated combined channel and shaping filter response for coherently demodulating the data symbols.

Figure 3A:
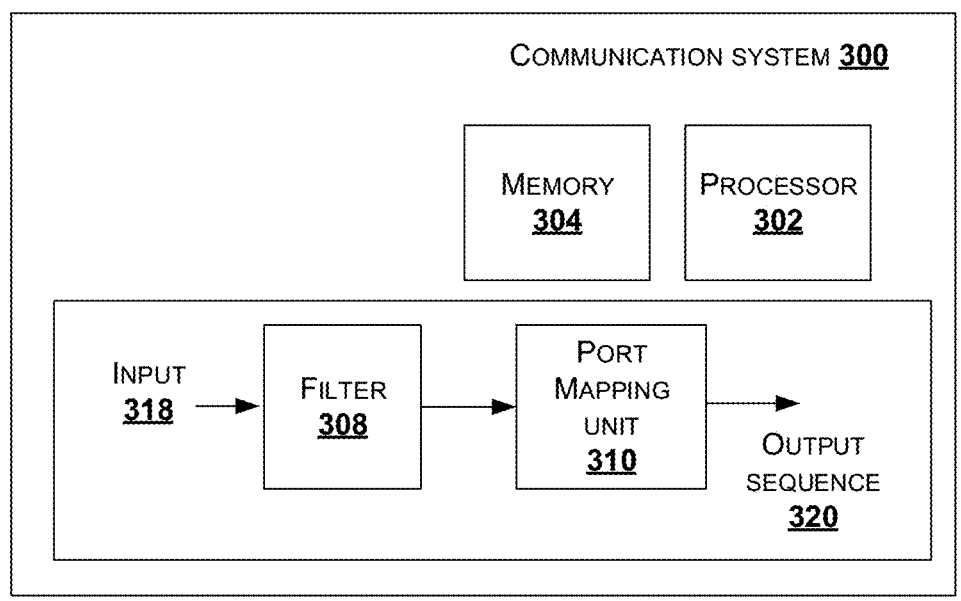
FIG. 3A shows a block diagram of a communication system for generating a signal, in accordance with an embodiment of the present disclosure.

FIG. 3A shows a block diagram of a communication system for generating a signal, in accordance with an embodiment of the present disclosure.

As shown in FIG. 3A, the communication system 300 comprises a processor 302, and memory 304 coupled with the processor. The communication system 300 hereinafter is referred as a transmitter. In an embodiment, the communication system 300 is a user equipment. The processor 302 may be configured to perform one or more functions of the communication system 300 for receiving filtered input 318 to generate an output signal 320 with at least one of low PAPR, reduced power and enhance coverage, for transmitting to a receiver. The generated signal is an uplink signal. In one implementation, the communication system 300 may comprise blocks 306, also referred as modules or units 306 for performing various operations in accordance with the embodiments of the present disclosure.

The transmitter 300 includes a filter 308 and a port mapping unit 310. The filter performs filtering a discrete Fourier transform spread orthogonal frequency division multiplexing (DFT-s-OFDM) data signal, and one of a DFT-S-OFDM and orthogonal frequency division multiplexing (OFDM) reference signal (RS) using a data filter and a RS filter respectively, to produce filtered data signal and filtered RS. The RS filter has one to one relationship with the data filter. In an embodiment, the DFT-S-OFDM RS is generated using a reference sequence modulated by one of a pi/2 rotated Binary Phase Shift Keying (BPSK), 8 Phase Shift Keying (8-PSK), and Zadoff-Chu (ZC) sequence, and the data signal is generated using a data sequence modulated by one of pi/2 Binary Phase Shift Keying (BPSK), Quadrature Phase Shift Keying (QPSK), and Quadrature Amplitude Modulation (QAM).

The OFDM RS is generated using a reference sequence modulated by one of Zadoff-Chu (ZC) sequence and frequency domain PSK sequence. Also, the transmitter is configured to obtain the DFT-S-OFDM data signal by rotating a modulated data sequence. The modulated data sequence is BPSK data sequence and rotation is performed on consecutive samples of the data sequence by 90-degrees.

The port mapping unit 310 performs port mapping the filtered RS to a corresponding port assigned to the transmitter to obtain port mapped filtered RS. The port mapped filtered RS comprises a first subset of non-zero locations comprising of the filtered RS values and a second subset of zero locations comprising of zero values.

In an embodiment, the transmitter 300 is configured to indicate characteristics of one of RS filter and data filter explicitly to a receiver. In another embodiment, the time domain impulse response of the RS filter is equal to the corresponding time domain impulse response of the data filter. Further, the frequency domain coefficients of the RS filter comprise a subset with a fixed number of frequency domain coefficients corresponding to the data filter.

In an embodiment, the frequency domain coefficients of the RS filter comprise even set of frequency domain coefficients corresponding to the data filter. Also, the frequency domain coefficients of the RS filter comprise odd set of frequency domain coefficients corresponding to the data filter. In another embodiment, the RS filter frequency domain coefficients comprises at least one of even subset of frequency domain coefficients corresponding to the data filter for a port number zero, and odd subset of frequency domain coefficients corresponding to the data filter for the port number one, for number of ports equal to two. In an embodiment, filtering the one of a DFT-S-OFDM RS and the OFDM RS is one of port dependent and port independent. Also, filtering the DFT-S-OFDM data is port independent.

Figure 3B:
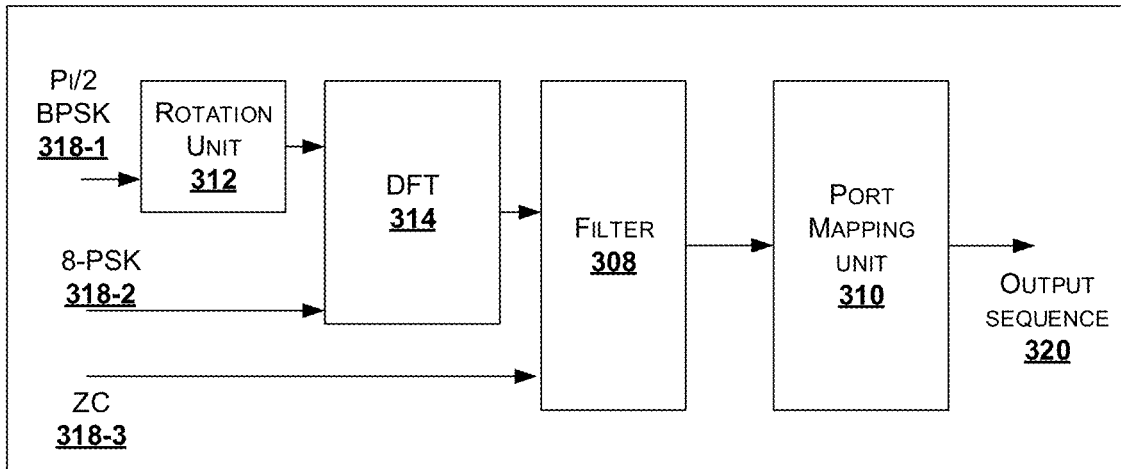
FIG. 3B shows an example illustrating various input reference signals to the communication system of FIG. 3A, for generating a signal, in accordance with an embodiment of the present disclosure.

FIG. 3B shows an example illustrating various input reference signals to the communication system of FIG. 3A, for generating an uplink signal, in accordance with an embodiment of the present disclosure.

As shown in FIG. 3B, the input is reference sequence which may be on of pi/2 BPSK 318-1, 8-PSK 318-2 and ZC 318-3. If the input RS is pi/2 BPSK, then the BPSK based RS is rotated by 90 degrees to obtain pi/2 rotated BPSK, thereafter transformed to obtain frequency domain transform signal. The frequency domain transformed signal is processed to generate a signal using the transmitter blocks filter 308 and port mapping unit 310.

In an embodiment, if the input RS is 8-PSK then the signal is transformed in to frequency domain and fed to the filter 308 and port mapping unit 310. In another embodiment, if the input RS is ZC then the signal is directly fed to the filter 308 followed by port mapping unit 310.

Figure 4:
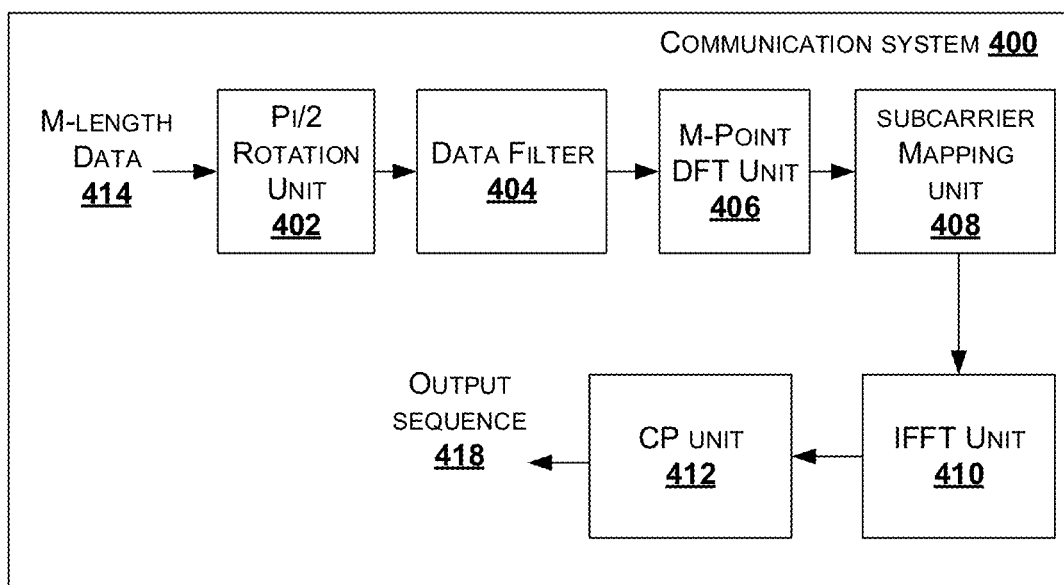
FIG. 4 shows a block diagram of a communication system for generating a pi/2 Binary Phase Shift Keying (BPSK) physical uplink shared channel (PUSCH) data having low PAPR with time domain shaping, in accordance with an embodiment of the present disclosure.

FIG. 4 shows a block diagram of a communication system for generating a pi/2 Binary Phase Shift Keying (BPSK) physical uplink shared channel (PUSCH) data having low PAPR with time domain shaping, in accordance with an embodiment of the present disclosure. The generation of filtered input to the transmitter 300 is mentioned in the below figures along with results.

As shown in FIG. 4, the communication system 400 comprises a processor, and memory (not shown in the figure) coupled with the processor. The communication system 400 may also be referred as a transmitter. The processor (not shown in the Figure) may be configured to perform one or more functions of the communication system 400 for receiving input data and generate waveform with at least one of low PAPR, reduced power and enhance coverage, for transmitting to a receiver. In one implementation, the communication system 400 may comprise modules/units for performing various operations in accordance with the embodiments of the present disclosure.

The transmitter 400 includes a Pi/2 rotation unit 402, a data filter 404, a M-point discrete Fourier transform (DFT) unit 406, a subcarrier mapping unit 408, an inverse fast Fourier transform (IFFT) unit 410 and a CP module 412. The data filter 404 may also be referred as a precoder, or data precoder. In an embodiment, the IFFT unit 410 may be an inverse DFT. As shown in FIG. 4, the transmitter 400 generates low PAPR PUSCH signal for data.

The Pi/2 rotation unit 402 receives an input M-length data to perform constellation rotation or $j^k$ rotation or $j^{(k \bmod 2)}$ rotation on the data 414 to generate a rotated data or rotated data sequence. In an embodiment, the data is one of binary phase shift keying (BPSK), 8-phase shift keying (PSK), quadrature amplitude modulation (QAM) and quaternary phase shift keying (QPSK). The rotated sequence is fed to the data filter 404 for filtering the rotated inputs sequence to produce filtered sequence or also referred as precoded data.

In an embodiment, considering time domain, the data filter 404 may be one of two-tap filter or multi-tap filter. The taps have equal magnitude values, in an embodiment. The taps have a symmetric shape in another embodiment. The data filter 404 reduces PAPR of the output waveform significantly. In an embodiment, the data filter 404 performs circular convolution on the rotated data to produce a filtered data, which is fed to the M-point DFT module 406.

The M-point DFT unit 406 transforms the filtered data into frequency domain signal, The DFT module 406 performs an M-point DFT operation on the filtered data.

The subcarrier mapping unit 408 performs a subcarrier mapping on the frequency domain signal to generate mapped signal. The IFFT unit 410 is configured to perform an inverse transform of the transformed sequence, to generate a time domain signal. After the IDFT or IFFT operation, the cyclic prefix unit 412 performs cyclic prefix operation on the time domain signal to generate output sequence 418.

Figure 5:
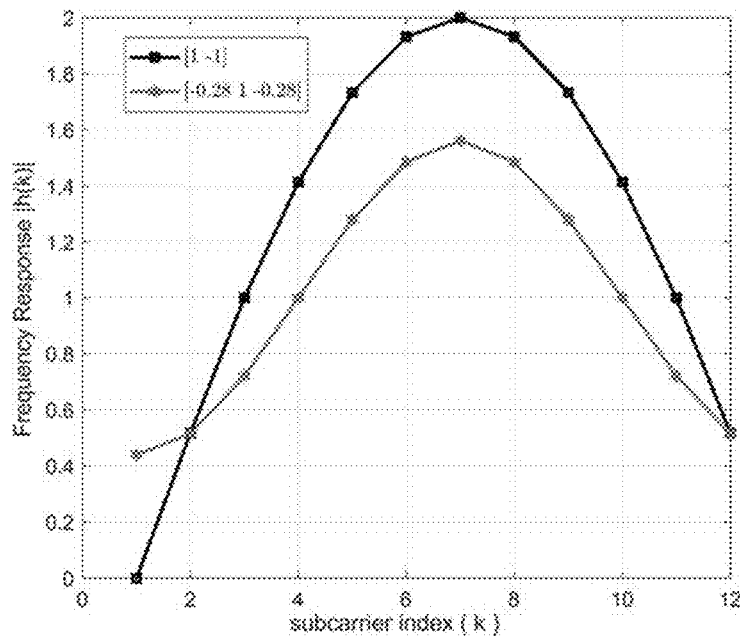
FIG. 5 shows an illustration of frequency response plot for 2-tap and 3-tap filters used by the communication system of FIG. 4, in accordance with an embodiment of the present disclosure.

FIG. 5 shows an illustration of frequency response plot for 2-tap and 3-tap filters used by the communication system of FIG. 4, in accordance with an embodiment of the present disclosure. FIG. 5 shows the shaping filter characteristics of the transmitter 400. In an embodiment, the data filter 404 may be any other generic filter. In time domain it is a circular convolution, the above coefficients may be taken and directly used for shaping the sequence.

Figure 6:
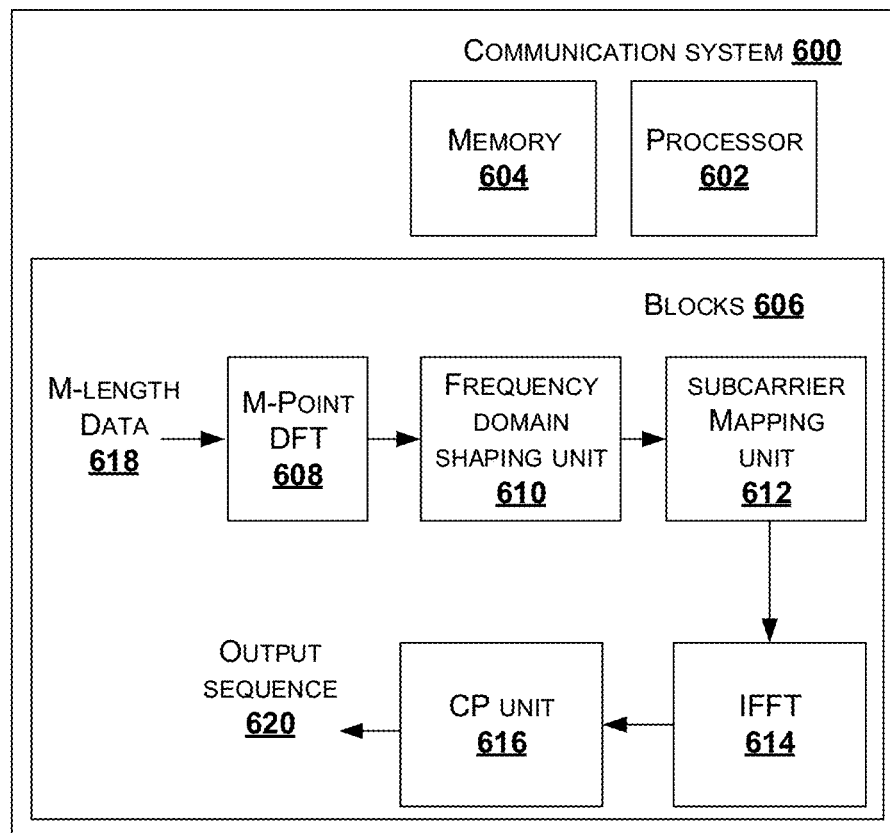
FIG. 6 shows a block diagram of a communication system for generating a pi/2 BPSK PUSCH data having low PAPR with frequency domain shaping, in accordance with an embodiment of the present disclosure.

FIG. 6 shows a block diagram of a communication system for generating a pi/2 BPSK PUSCH data having low PAPR with frequency domain shaping, in accordance with an embodiment of the present disclosure.

As shown in FIG. 6, the communication system 600 comprises a processor 602, and memory 604 coupled with the processor. The communication system 600 may also be referred as a transmitter. The processor 602 may be configured to perform one or more functions of the communication system 600 for receiving input data and generate waveform with at least one of low PAPR, reduced power and enhance coverage, for transmitting to a receiver. In one implementation, the communication system 600 may comprise modules/units 606 for performing various operations in accordance with the embodiments of the present disclosure.

The transmitter 600 includes a M-point discrete Fourier transform (DFT) unit 608, frequency domain shaping unit 610, a subcarrier mapping unit 612, an inverse fast Fourier transform (IFFT) unit 614 and a CP unit 616. In an embodiment, the IFFT unit 614 may be an inverse DFT. The transmitter 600 of FIG. 6, generates low PAPR PUSCH signal for data.

The M-point DFT unit 608 transforms an input data 618 into frequency domain signal. In an embodiment, the transmitter 600 may comprise generation of a binary sequence of length M, and mapping it to BPSK constellation. Also, a π/2 BPSK modulation is performed on a selected binary sequence of length equal to M.

The frequency domain shaping unit 610, also referred as a frequency domain data filter filters the transformed data signal in to filtered transformed data signal. The subcarrier mapping unit 612 performs a subcarrier mapping on the filtered transformed signal to generate mapped signal. The IFFT unit 614 is configured to perform an inverse transform of the mapped signal, to generate a time domain signal. In an embodiment, the FFT may be an inverse DFT. The cyclic prefix unit 616 performs cyclic prefix operation on the time domain signal to generate output sequence 620.

Figure 7A:
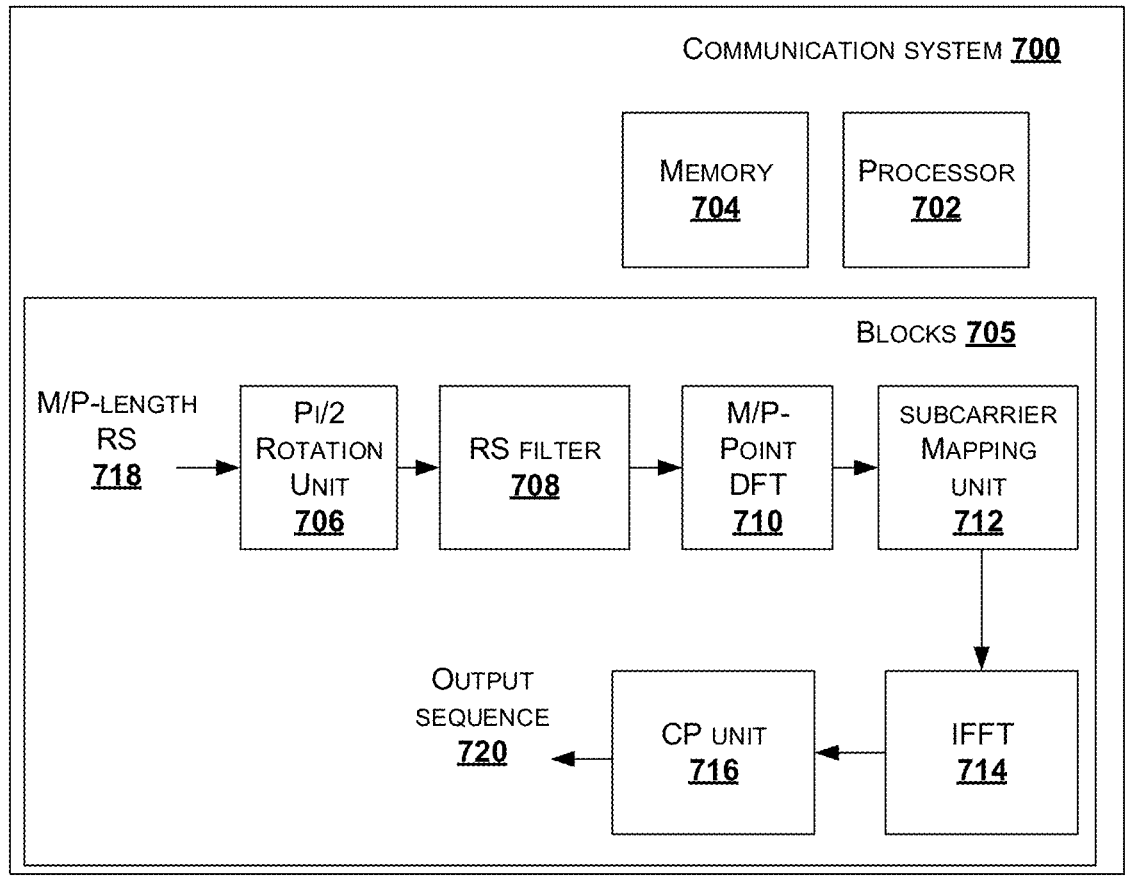
FIG. 7A shows a block diagram of a communication system for generating a pi/2 BPSK reference signal (RS), in accordance with an embodiment of the present disclosure.

FIG. 7A shows a block diagram of a communication system for generating a pi/2 BPSK reference signal (RS), in accordance with an embodiment of the present disclosure.

As shown in FIG. 7, the communication system 700 comprises a processor 702, and memory 704 coupled with the processor 702. The communication system 700 may also be referred as a transmitter. The processor 702 may be configured to perform one or more functions of the communication system 700 for receiving reference signals or DMRS sequences, and generate waveform with at least one of low PAPR, reduced power and enhance coverage, for transmitting to a receiver. In one implementation, the communication system 700 may comprise blocks 705, also referred as units or modules, for performing various operations in accordance with the embodiments of the present disclosure.

The blocks 705 includes a Pi/2 rotation unit 706, a reference sequence (RS) filter 708, a M/P-point discrete Fourier transform (DFT) unit 710, a subcarrier mapping unit 712, an inverse fast Fourier transform (IFFT) unit 714 and a CP unit 716. In an embodiment, the IFFT unit 714 may be an inverse DFT.

The Pi/2 rotation unit 706 receives an input reference sequence of M/P-length to perform constellation rotation or $j^k$ or $j^{(k \bmod 2)}$ rotation on the M/P-length RS 718 to generate a rotated RS. In an embodiment, the data is one of binary phase shift keying (BPSK), 8-phase shift keying (PSK) and Zadoff-Chu (ZC) sequence.

In an embodiment, based on the total number of ports, in an embodiment RS or DMRS ports, configured "P", taking a sequence of length "M/P". The Length M/P sequence may be one of BPSK sequence, PSK sequence. The sequence is chosen such that, the sequence characteristics has good auto, cross correlation properties and has low PAPR.

In an embodiment, π/2 BPSK (or PSK or QAM modulation) modulation is performed using Pi/2 rotation unit 706 for selected binary sequence of length equal to M/P where M is the length of the data and P is the total number of ports, for example RS or DMRS ports.

The rotated sequence is fed to the RS filter 708 for filtering the rotated RS to produce filtered sequence or also referred as precoded data.

In an embodiment, considering time domain, the RS filter 708 may be one of two-tap filter or multi-tap filter. The taps have equal magnitude values, in an embodiment. The taps have a symmetric shape in another embodiment. The RS filter 708 reduces PAPR of the output waveform significantly. In an embodiment, the RS filter 708 performs circular convolution on the rotated RS to produce a filtered RS, which is fed to the M/P-point DFT unit 710.

In an embodiment, the RS filter is a circular convolution performed in time domain using a time domain RS filter. If time domain RS filter is not specified explicitly, it may be derived from the data filter, as shown in FIG. 7B.

Figure 7B:
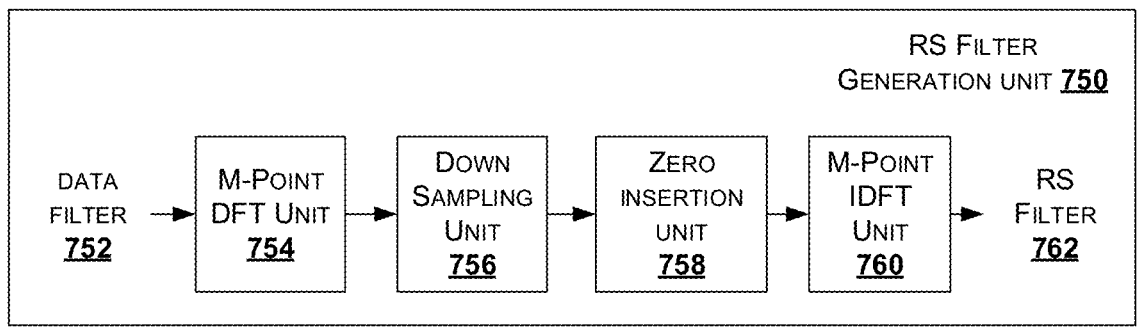
FIG. 7B shows a block diagram illustrating generation of reference signal (RS) filter using data filter, in accordance with an embodiment of the present disclosure.

FIG. 7B shows a block diagram illustrating generation of reference signal (RS) filter using data filter, in accordance with an embodiment of the present disclosure. As shown in FIG. 7B, the RS filter is generated using the RS filter generation unit 750 comprising M-point DFT unit 754, down sampling unit 756, zero insertion unit 758, and M-point Inverse-DFT (IDFT). The M-point DFT unit 754 performs DFT operation on a time domain data filter 752 to generate frequency domain data filter. The frequency domain data filter is down sampled by a factor 'P' using a down sampling unit 756 to result in down sampled frequency domain data filter. Zero insertion unit 758 inserts zeros on to the frequency domain data filter. The M-point IDFT unit 760 performs inverse DFT on the zero inserted down sampled data filter to generate time domain RS filter 762.

Referring back to FIG. 7A, the M/P-point DFT unit 710 transforms the filtered RS into frequency domain signal. The subcarrier mapping unit 712 performs a subcarrier mapping on the frequency domain signal to generate mapped signal. The IFFT unit 714 performs an inverse Fast Fourier Transform or inverse DFT on the mapped signal to generate a time domain signal. The cyclic prefix unit 716 performs cyclic prefix operation on the time domain signal to generate output sequence 720. The generated output sequence has low PAPR value.

In the alternate embodiment, based on the total number of DMRS ports configured "P", taking a sequence of length "M/P". The Length M/P sequence may be one of QPSK sequence, Zadoff-chu sequence. The sequence is chosen such that, the sequence characteristics has good auto, cross correlation properties and has low PAPR.

The frequency domain sequence is fed to the RS filter 708 for filtering to produce the filtered RS or also referred as precoded RS or also referred as spectrally shaped RS. In an embodiment, the RS filter 708 performs circular convolution on the frequency domain RS to produce a filtered RS.

The M/P point DFT 710 performs transformation of time domain RS in to frequency domain RS i.e. filtered RS in to transformed RS. The transformed filtered RS is port mapped to a corresponding port of the transmitter to obtain port mapped transformed RS.

The subcarrier mapping unit 712 performs a subcarrier mapping on the port mapped transformed RS to generate mapped signal. The IFFT unit 714 performs an inverse Fast Fourier Transform or inverse DFT on the mapped signal to generate a time domain signal. The cyclic prefix unit 716 performs cyclic prefix operation on the time domain signal to generate output sequence 720. The generated output sequence has low PAPR value.

Figure 8A:
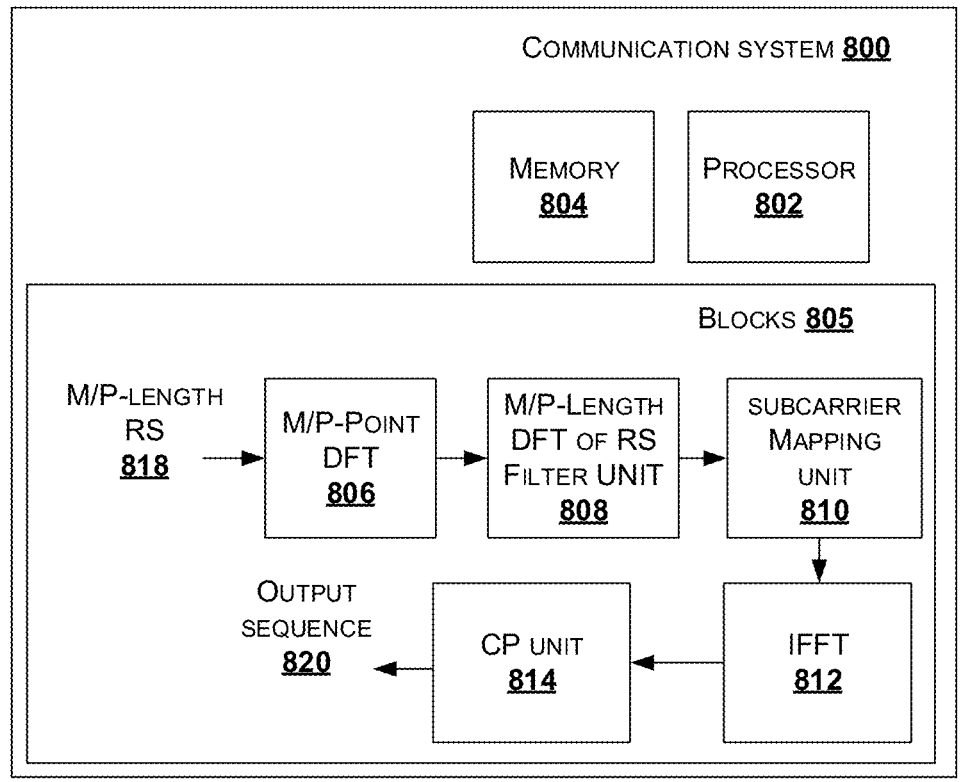
FIG. 8A shows a block diagram of a communication system for generating a reference signal with frequency domain shaping, in accordance with an alternative embodiment of the present disclosure.

FIG. 8A shows a block diagram of a communication system for generating a reference signal having low PAPR with frequency domain shaping, in accordance with an alternative embodiment of the present disclosure.

As shown in FIG. 8A, the communication system 800 comprises a processor 802, and memory 804 coupled with the processor 802. The communication system 800 is hereinafter referred as a transmitter. The processor 802 may be configured to perform one or more functions of the communication system 800 for generating PUSCH DMRS sequences with low PAPR In one implementation, the communication system 800 may comprise block 805, also referred as units or modules, for performing various operations in accordance with the embodiments of the present disclosure.

The blocks 805 includes a M/P-point discrete Fourier transform (DFT) unit 806, M/P-point DFT of RS filter unit 808, a subcarrier mapping unit 810, an inverse fast Fourier transform (IFFT) unit 814 and a CP unit 814. In an embodiment, the IFFT unit 814 may be an inverse DFT.

As shown in FIG. 8, the transmitter 800 is an alternative to time domain convolution, spectrum shaping may be applied post-DFT using frequency domain filter. The M/P-point DFT unit 806 transforms input M/P length reference signal (RS) into frequency domain signal. Based on the total number of DMRS ports configured "P", taking a sequence of length "M/P". The M/P length sequence may be a BPSK sequence or 8-PSK sequence. The M/P length DFT of RS Filter unit 808 multiplies the M/P length sequence with the frequency domain RS filter of size M/P to produce frequency domain filtered RS or transformed filtered RS. The frequency domain RS filter may be obtained by taking the M/P point DFT of the time domain RS filter or time domain precoder. The transformed filtered RS is port mapped to a corresponding port of the transmitter to obtain port mapped transformed RS.

The subcarrier mapping unit 810 performs subcarrier mapping as per comb structure instructed by the base station. The subcarrier mapping is performed on the frequency domain port mapped transformed RS to generate mapped signal. The IFFT unit 812 performs an inverse Fast Fourier Transform or inverse DFT on the mapped signal to generate a time domain signal. The cyclic prefix unit 814 performs cyclic prefix operation on the time domain signal to generate output sequence 820. The generated output sequence has low PAPR value.

In an embodiment, the Time domain or frequency domain RS filter either can be explicitly specified or can be derived from the data filter as given in transmitter 700. The transmitter 800 as shown in FIG. 8, the PAPR of the RS transmitted on any one of the P ports is identical. Furthermore, the BS receiver estimates the channel state information (CSI) from any one of the combs (that is allocated to the UE) and uses this information for the equalization of data. The channel estimated on any port will remain identical (in case the channel is the same across the ports). The filter does not impact any of the receiver procedures. Note that under noise free conditions, the estimated CSI on any one of the ports are equal and is also equal to the CSI experienced by pi/2 BPSK PUSCH data.

Figure 8B:
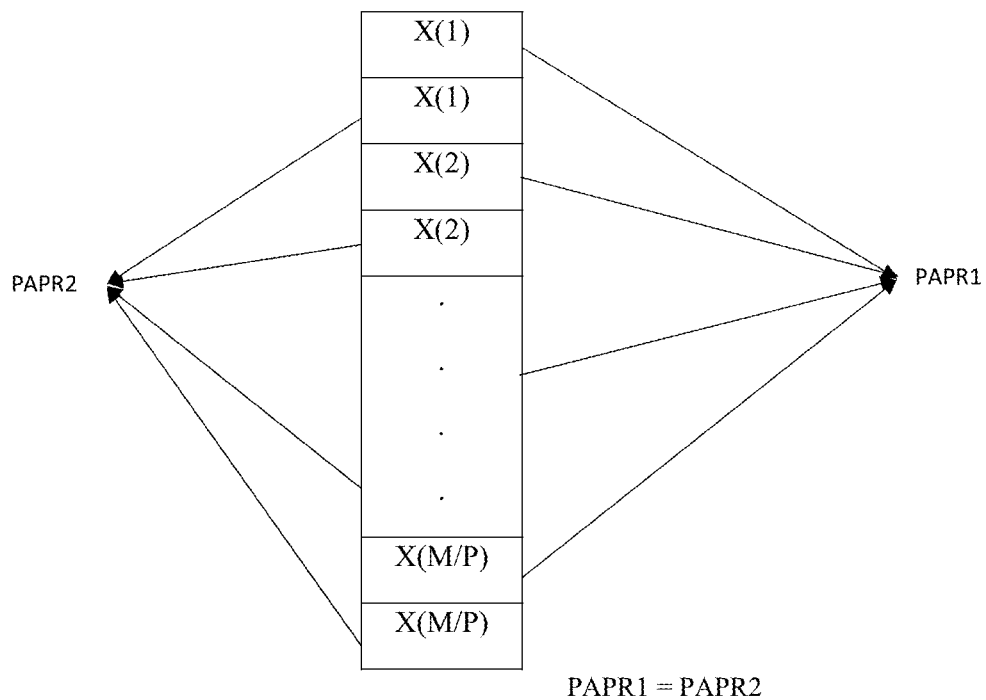
FIG. 8B shows an example illustration of RS symbol with Comb2 structure where same sequence loaded onto two set of tones of FIGS. 7A and 8A, in accordance with an embodiment of the present disclosure.

FIG. 8B shows an example illustration of RS symbol with Comb2 structure where same sequence loaded onto two set of tones of FIGS. 7A and 8A, in accordance with an embodiment of the present disclosure.

In an alternate embodiment, based on the total number of DMRS ports configured "P", taking a sequence of length "M/P". The M/P length sequence may be a QPSK sequence or Zadoff-Chu sequence. The M/P length DFT of RS Filter unit 808 multiplies the M/P length sequence to result in spectral shaped RS. The frequency domain RS filter may be obtained by taking the M/P point DFT of one of time domain RS filter and time domain precoder.

The subcarrier mapping unit 810 performs subcarrier mapping as per comb structure instructed by the base station.

The subcarrier mapping is performed on the frequency domain signal generated by the M/P length DFT of RS Filter unit 808, to generate mapped signal. The IFFT unit 812 performs an inverse Fast Fourier Transform or inverse DFT on the mapped signal to generate a time domain signal. The cyclic prefix unit 814 performs cyclic prefix operation on the time domain signal to generate output sequence 820. The generated output sequence has low PAPR value.

Figure 9A:
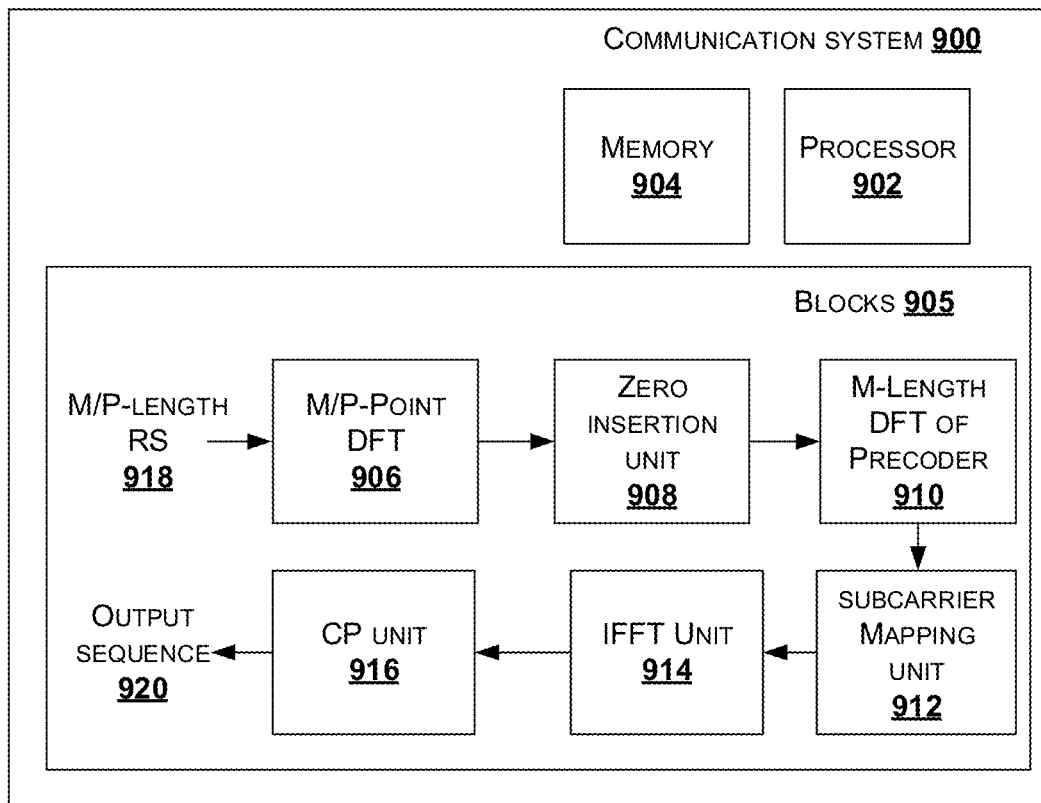
FIG. 9A shows a block diagram of a communication system for generating a reference signal (RS) with frequency domain shaping, in accordance with an alternative embodiment of the present disclosure.

FIG. 9A shows a block diagram of a communication system for generating a reference signal having low PAPR with frequency domain shaping, in accordance with another alternative embodiment of the present disclosure.

As shown in FIG. 9A, the communication system 900 comprises a processor 902, and memory 904 coupled with the processor 902. The communication system 900 is hereinafter referred as a transmitter. The processor 902 may be configured to perform one or more functions of the communication system 900 for generating reference sequences with low PAPR In one implementation, the communication system 900 may comprise block 905, also referred as units or modules, for performing various operations in accordance with the embodiments of the present disclosure.

The blocks 905 includes a M/P-point discrete Fourier transform (DFT) unit 906, zero insertion unit 908, M-length DFT of precoder 910, a subcarrier mapping unit 912, an inverse fast Fourier transform (IFFT) unit 914 and a CP unit 916. In an embodiment, the IFFT unit 914 may be an inverse DFT.

The M/P-point DFT unit 906 transforms input M/P length reference signal (RS) into frequency domain signal. Based on the total number of DMRS ports configured "P", taking a sequence of length "M/P". The M/P length sequence may be a BPSK sequence or PSK sequence. The zero insertion unit 908 generates a length M sequence by inserting zeros at appropriate locations to generate a reference signal corresponding to the port. The M-length DFT of RS Filter unit 910 multiplies the M length sequence with the frequency domain RS filter of size M. The frequency domain RS filter may be obtained by taking the M point DFT of the time domain RS filter or time domain precoder.

In one embodiment, if the time domain RS filter is specified explicitly, then the frequency domain RS filter may be obtained by taking every $P^{th}$ coefficient of M point DFT of the time domain RS filter. Thereafter, placing them in the locations which are multiples of P while the other locations are zero, where P is the total number of ports configured. For example, if P=2 the frequency domain RS filter may be [x(0) 0 x(2) 0 x(4) 0 x(6) 0 x(8) 0 x(10) 0], where x(k) is DFT of time domain RS filter.

Figure 9B:
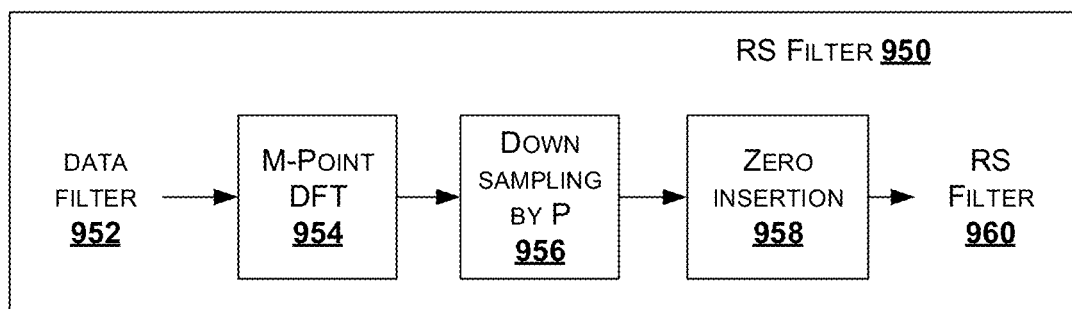
FIG. 9B shows a block diagram illustrating generation of reference signal (RS) filter for the communication system of FIG. 9A, in accordance with an embodiment of the present disclosure.

For example, if the time domain RS filter is not specified explicitly, then RS filter can be derived from the data filter as shown in FIG. 9B.

FIG. 9B shows a block diagram illustrating generation of reference signal (RS) filter for the communication system of FIG. 9A, in accordance with an embodiment of the present disclosure. As shown in FIG. 9B, the RS filter is generated using the RS filter generation unit 950 comprising M-point DFT unit 954, down sampling unit 956, and zero insertion unit 958. The M-point DFT unit 954 performs DFT operation on a time domain data filter 952 to generate frequency domain data filter. The frequency domain data filter is down sampled by a factor 'P' using a down sampling unit 956 to result in down sampled frequency domain data filter. The down sampling is performed such that every $P^{th}$ coefficient is collected starting from $0^{th}$ coefficient to generate a M/P length frequency domain filter. Then, P−1 zeros are inserted between two consecutive samples of M/P length frequency domain filter 960 to generate a M length frequency domain filter using zero insertion unit 958. For example, if P=2 the frequency domain RS filter may be [x(0) 0 x(2) 0 x(4) 0 x(6) 0 x(8) 0 x(10) 0], where x(k) is DFT of time domain data filter.

Referring back to FIG. 9A, the subcarrier mapping unit 912 performs subcarrier mapping on the frequency domain signal generated by the M length DFT of precoder 910, to generate mapped signal. The IFFT unit 914 performs an inverse Fast Fourier Transform or inverse DFT on the mapped signal to generate a time domain signal. The cyclic prefix unit 916 performs cyclic prefix operation on the time domain signal to generate output sequence 920. The generated output sequence has low PAPR value.

In an embodiment, the RS filter is a circular convolution performed in time domain using a time domain RS filter. If time domain RS filter is not specified explicitly, it may be derived from the data filter, as shown in FIG. 9B.

In an alternate embodiment, based on the total number of DMRS ports configured "P", taking a sequence of length "M/P". The M/P length sequence may be a QPSK sequence or Zadoff-Chu sequence. The zero insertion unit 908 generates a length M sequence by inserting zeros at appropriate locations to generate a reference signal corresponding to the port. The M-length DFT of RS Filter unit 910 multiplies the M length sequence with the frequency domain RS filter of size M. The frequency domain RS filter may be obtained by taking the M point DFT of one of the time domain RS filter and the time domain precoder.

The subcarrier mapping unit 912 performs subcarrier mapping on the frequency domain signal generated by the M length DFT of precoder 910, to generate mapped signal. The IFFT unit 914 performs an inverse Fast Fourier Transform or inverse DFT on the mapped signal to generate a time domain signal. The cyclic prefix unit 916 performs cyclic prefix operation on the time domain signal to generate output sequence 920. The generated output sequence has low PAPR value.

Figure 10A:
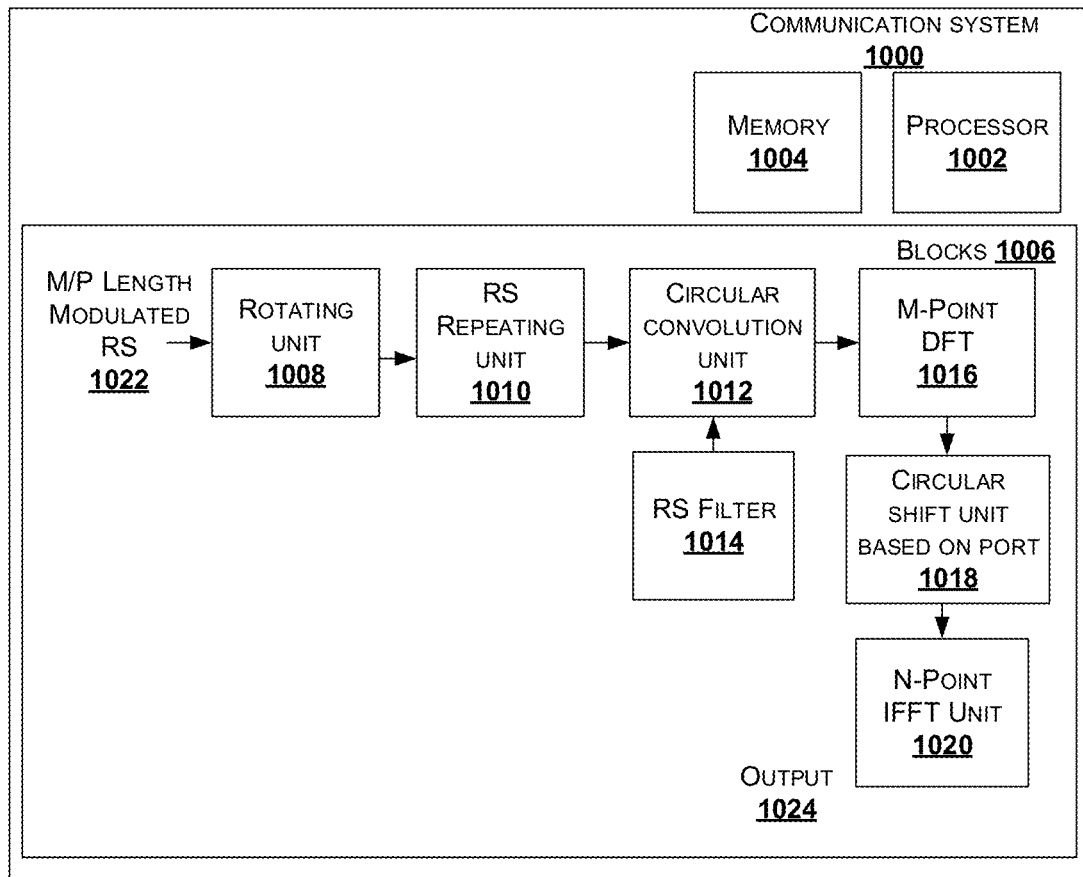
FIG. 10A shows a block diagram of a communication system for generating a reference sequence, in accordance with another embodiment of the present disclosure.

FIG. 10A shows a block diagram of a communication system for generating a reference sequence, in accordance with another embodiment of the present disclosure.

As shown in FIG. 10A, the communication system 1000 comprises a processor 1002, and memory 1004 coupled with the processor 1002. The communication system 1000 hereinafter referred as a transmitter. The processor 1002 may be configured to perform one or more functions of the communication system 1000 for generating PUSCH DMRS sequences with low PAPR In one implementation, the communication system 1000 may comprise blocks 1006, also referred as modules or units for performing various operations in accordance with the embodiments of the present disclosure.

The blocks 1006 includes a rotating unit 1008, RS repeating unit 1010, a circular convolution unit 1012, RS Filter 1014, a M-point DFT 1016, a circular shift unit based on port 1018, and an N-point inverse fast Fourier transform (IFFT) unit 1020. In an embodiment, the IFFT unit 1020 may be an inverse DFT.

The transmitter is configured to generating DMRS in a manner such that PAPR of reference signals is maintained irrespective of antenna port it is mapped. For example, creating a length M RS, i.e. DMRS sequence using a length M/P by repeating the M/P length sequence P times. where P is the total number of DMRS ports configured $X1 = [X \ X \ \ldots, P \ \text{times}]$ The reference signal is rotated using rotating unit 1008. Considering a M/P length DMRS sequence and generating a M length sequence by repeating M/P length DMRS sequence P times in time domain using RS repeating unit 1010, where P is the total number of DMRS ports configured. M/P length DMRS sequence can be one of the BPSK sequence or PSK sequence.

The circular convolution unit 1012 performs spectrum shaping in time domain by applying circular convolution on the resulted M length sequence with time domain RS filter 1014. The M-point DFT unit transforms the resulted spectrum shaped DMRS sequence to generate frequency domain DMRS sequence.

The frequency domain DMRS sequence is circularly shifted by 'p' samples to result the DMRS sequence for $p^{th}$ port, using a circular shift unit based on port 1018. For example, for port-1 the frequency domain sequence is shifted by 1 sample. Thereafter, a subcarrier mapping is performed to generate mapped signal, which transformed using IFFT by N-point IFFT unit 1020 followed by CP addition to generate RS 1074 with low PAPR FIG. 10B shows a block diagram of a communication system for generating a reference sequence, in accordance with yet another embodiment of the present disclosure.

Figure 10B:
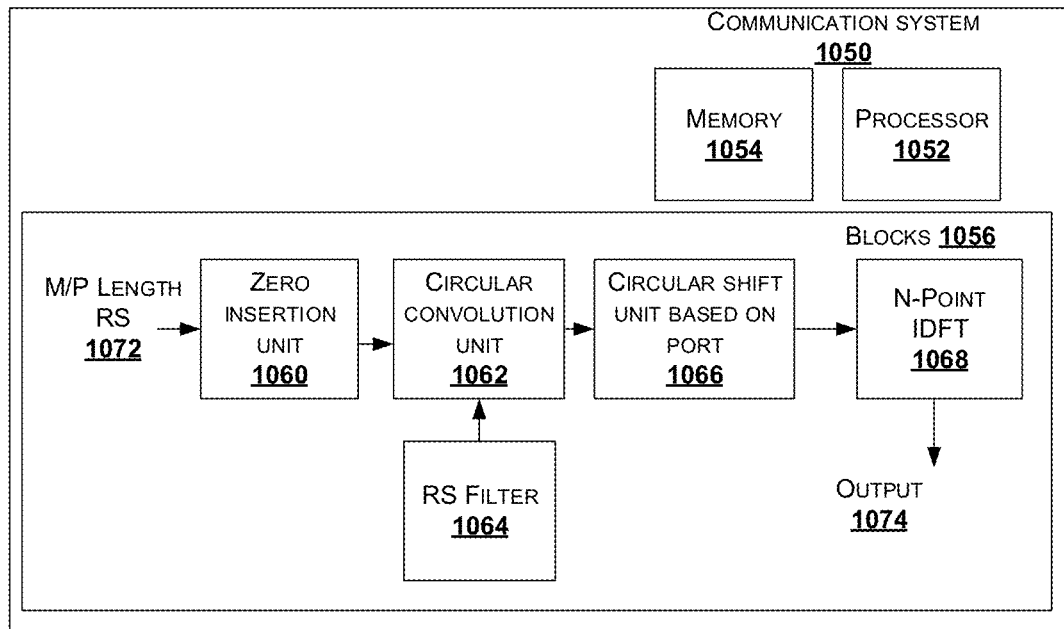
FIG. 10B shows a block diagram of a communication system for generating a reference sequence, in accordance with yet another embodiment of the present disclosure.

As shown in FIG. 10B, the communication system 1050 comprises a processor 1052, and memory 1054 coupled with the processor 1052. The communication system 1050 hereinafter referred as a transmitter. The processor 1052 may be configured to perform one or more functions of the communication system 1050 for generating PUSCH DMRS sequences with low PAPR In one implementation, the communication system 1050 may comprise blocks 1056, also referred as modules or units for performing various operations in accordance with the embodiments of the present disclosure.

The blocks 1056 includes a zero insertion unit 1060, a circular convolution unit 1062, a RS Filter 1064, a circular shift unit based on port 1066, and an N-point inverse fast Fourier transform (IFFT) unit 1068. In an embodiment, the IFFT unit 1068 may be an inverse DFT.

The transmitter 1050 is configured to generate DMRS in a manner such that PAPR of reference signals is maintained irrespective of antenna port it is mapped. For example, creating a M-length DMRS sequence using a length M/P frequency domain RS sequence by inserting P−1 zeros, using zero insertion unit 1060, between two consecutive samples of M/P length frequency domain RS. The M/P length sequence may be one of a QPSK sequence and a Zadoff-Chu sequence, where P is total number of ports.

The circular convolution unit 1062 performs spectrum shaping in time domain by applying circular convolution on the resulted M length sequence with time domain RS filter 1064 to generate precoded DMRS sequence.

The precoded DMRS sequence is circularly shifted by 'p' samples to result the DMRS sequence for $p^{th}$ port, using a circular shift unit based on port 1066. For example, for port-1 the frequency domain sequence is shifted by 1 sample. Thereafter, a subcarrier mapping is performed to generate mapped signal, which transformed using IFFT by N-point IFFT unit 1068 followed by CP addition to generate RS 1074 with low PAPR FIG. 11A shows a block diagram of a communication system for generating a RS with frequency domain spectrum shaping and circular rotation, in accordance with an alternative embodiment of the present disclosure.

Figure 11A:
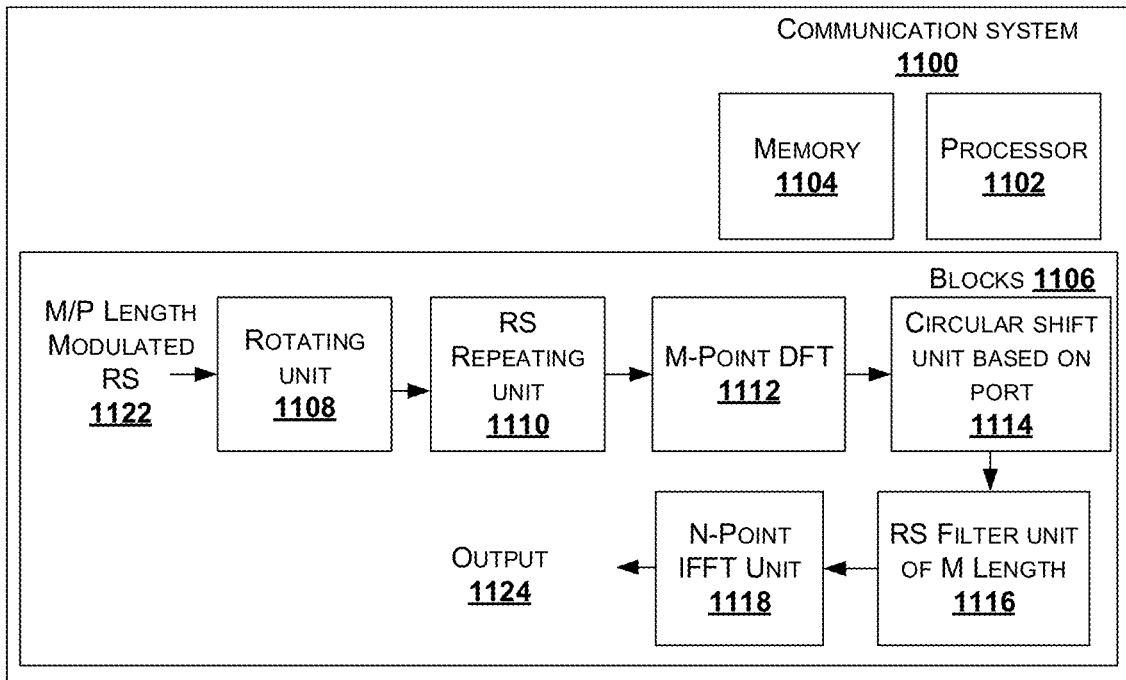
FIG. 11A shows a block diagram of a communication system for generating a RS with frequency domain spectrum shaping and circular rotation, in accordance with an alternative embodiment of the present disclosure.

As shown in FIG. 11A, the communication system 1100 comprises a processor 1102, and memory 1104 coupled with the processor 1102. The communication system 1100 hereinafter referred as a transmitter. The processor 1102 may be configured to perform one or more functions of the communication system 1100 for generating reference sequences with low PAPR. In one implementation, the communication system 1100 may comprise blocks 1106, also referred as modules or units for performing various operations in accordance with the embodiments of the present disclosure.

The blocks 1106 includes a rotating unit 1108, RS repeating unit 1110, a M-point DFT 1112, a circular shift unit based on port 1114, RS Filter unit of M-length 1116 and an N-point inverse fast Fourier transform (IFFT) unit 1116. In an embodiment, the IFFT unit 1116 may be an inverse DFT.

The transmitter is configured to generating DMRS in a manner such that PAPR of reference signals is maintained irrespective of antenna port it is mapped. For example, creating a length M RS, i.e. DMRS sequence using a length M/P by repeating the M/P length sequence P times. where P is the total number of DMRS ports configured $$X1=[X\ X\ \ldots\ ,P\ \text{times}]$$

The reference signal is rotated using rotating unit 1108. Considering a M/P length DMRS sequence and generating a M length sequence by repeating M/P length DMRS sequence P times in time domain using RS repeating unit 1110, where P is the total number of ports configured or number of RS ports. M/P length DMRS sequence may be one of BPSK sequence and PSK sequence.

The M-point DFT 1112 transforms the generated M-length sequence into frequency domain sequence. The circular shift unit based on port 1114 performs circular rotation of the frequency domain DMRS sequence by 'p' samples, where p is the port number. For example, for port-1, circularly rotating the frequency domain RS by 1 sample.

M-length RS filter unit 1116 performing spectrum shaping of the frequency domain RS by multiplying it with the frequency domain RS filter. In an embodiment, if the time domain RS filter is specified explicitly, then the frequency domain RS filter may be obtained by taking every Pth coefficient from the M point DFT of the time domain RS filter and placing them in the locations which are multiples of P while the other locations are zero. P is the total number of ports configured. For example, if P=2 the frequency domain RS filter may be [x(0) 0 x(2) 0 x(4) 0 x(6) 0 x(8) 0 x(10) 0], where x(k) is DFT of time domain RS filter.

In an embodiment, considering that the time domain RS filter is specified explicitly, then the frequency domain RS filter may be obtained by taking every Pth coefficient from the M point DFT of the time domain RS filter, with first sample starting from p, where P is the total number of ports configured and p is the port number. For example, if P=2 the frequency domain RS filter may be [x(0) 0 x(2) 0 x(4) 0 x(6) 0 x(8) 0 x(10) 0] for port-0 and [0 x(1) 0 x(3) 0 x(5) 0 x(7) 0 x(9) 0 x(11)] for port-1, where x(k) is DFT of time domain RS filter.

In an embodiment, if the time domain RS filter is nor specified explicitly, then the frequency domain RS filter can be derived from the data filter by, computing a M point DFT of the time domain data filter to generate frequency domain DATA filter, down sampling the frequency domain data filter by P times, such that every Pth coefficient is collected starting from 0th coefficient to generate a M/P length frequency domain filter. Then, P−1 zeros are inserted between two consecutive samples of M/P length frequency domain filter to generate a M length frequency domain filter as shown in FIG. 10A. For example, if P=2 the frequency domain RS filter may be [x(0) 0 x(2) 0 x(4) 0 x(6) 0 x(8) 0 x(10) 0], where x(k) is DFT of time domain data filter. Subcarrier mapping followed by IFFT and CP addition to generate RS 1124 i.e. DMRS with low PAPR.

In an embodiment, if the time domain RS filter is nor specified explicitly, then the frequency domain RS filter can be derived from the data filter by, computing a M point DFT of the time domain data filter to generate frequency domain DATA filter, down sampling the frequency domain data filter by P times, such that every Pth coefficient is collected starting from the pth coefficient to generate a M/P length frequency domain filter. Where, P, p are total number of ports and port number respectively. Then, P−1 zeros are inserted between two consecutive samples of M/P length frequency domain filter to generate a M length frequency domain filter as shown in FIG. 10A. For example, if P=2 the frequency domain RS filter may be [x(0) 0 x(2) 0 x(4) 0 x(6) 0 x(8) 0 x(10) 0] for port-O and [0 x(1) 0 x(3) 0 x(5) 0 x(7) 0 x(9) 0 x(11)] for port-1 respectively, where x(k) is DFT of time domain data filter. Thereafter, performing subcarrier mapping followed by IFFT and CP addition to generate RS 1124 i.e. DMRS with low PAPR.

Figure 11B:
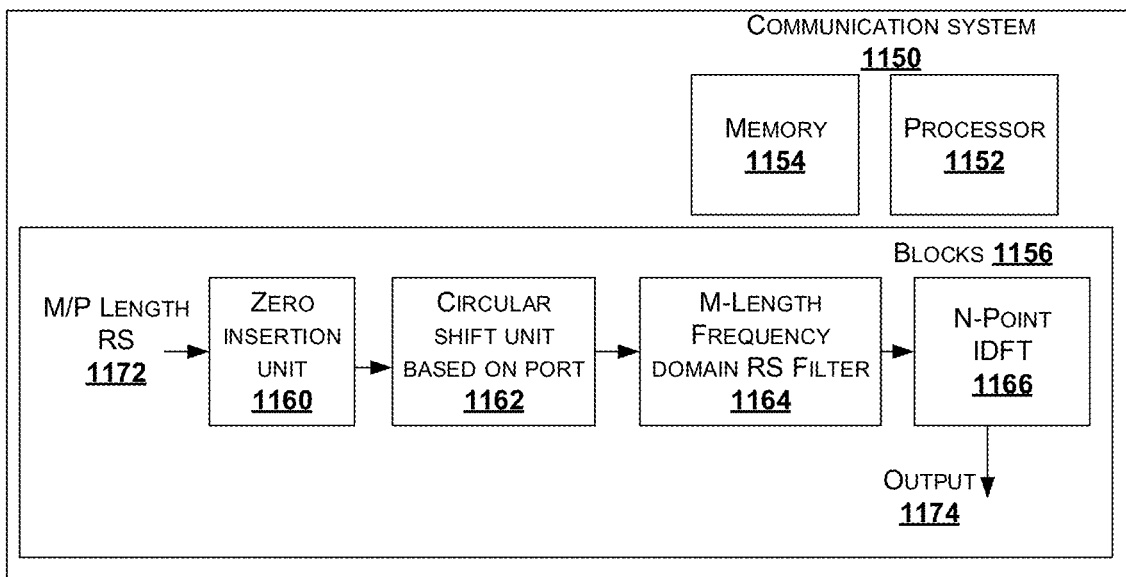
FIG. 11B shows a block diagram of a communication system for generating a RS with frequency domain spectrum shaping and circular rotation, in accordance with another alternative embodiment of the present disclosure.

FIG. 11B shows a block diagram of a communication system for generating a RS with frequency domain spectrum shaping and circular rotation, in accordance with another alternative embodiment of the present disclosure.

As shown in FIG. 11B, the communication system 1150 comprises a processor 1152, and memory 1154 coupled with the processor 1152. The communication system 1150 hereinafter referred as a transmitter. The processor 1152 may be configured to perform one or more functions of the communication system 1150 for generating reference sequences with low PAPR In one implementation, the communication system 1150 may comprise blocks 1156, also referred as modules or units for performing various operations in accordance with the embodiments of the present disclosure.

The blocks 1156 includes a zero insertion unit 1160, a circular shift unit based on port 1162, RS Filter unit of M-length 1164, also referred as M-length frequency domain RS Filter, and an N-point inverse fast Fourier transform (IFFT) unit 1166. In an embodiment, the IFFT unit 1166 may be an inverse DFT.

The transmitter 1150 is configured to generating DMRS in a manner such that PAPR of reference signals is maintained irrespective of antenna port it is mapped. For example, creating a length M DMRS sequence using a length M/P frequency domain RS sequence by inserting P−1 zeros between two consecutive samples of M/P length frequency domain RS. The M/P length sequence may be one of a QPSK sequence and Zadoff-Chu sequence, where P is total number of ports.

The circular shift unit based on port 1162 performs circular rotation of the M-length DMRS sequence by 'p' samples, where p is the port number. For example, for port-1, circularly rotating the frequency domain RS by 1 sample. The M-length RS filter unit 1164, also referred as M-length frequency domain RS Filter, performing spectrum shaping of the circularly shifted RS by multiplying it with the frequency domain RS filter. Thereafter, the spectrum shaped signal is transformed using IFFT by N-point IFFT unit 1166 followed by CP addition to generate RS 1174 with low PAPR.

Figure 12:
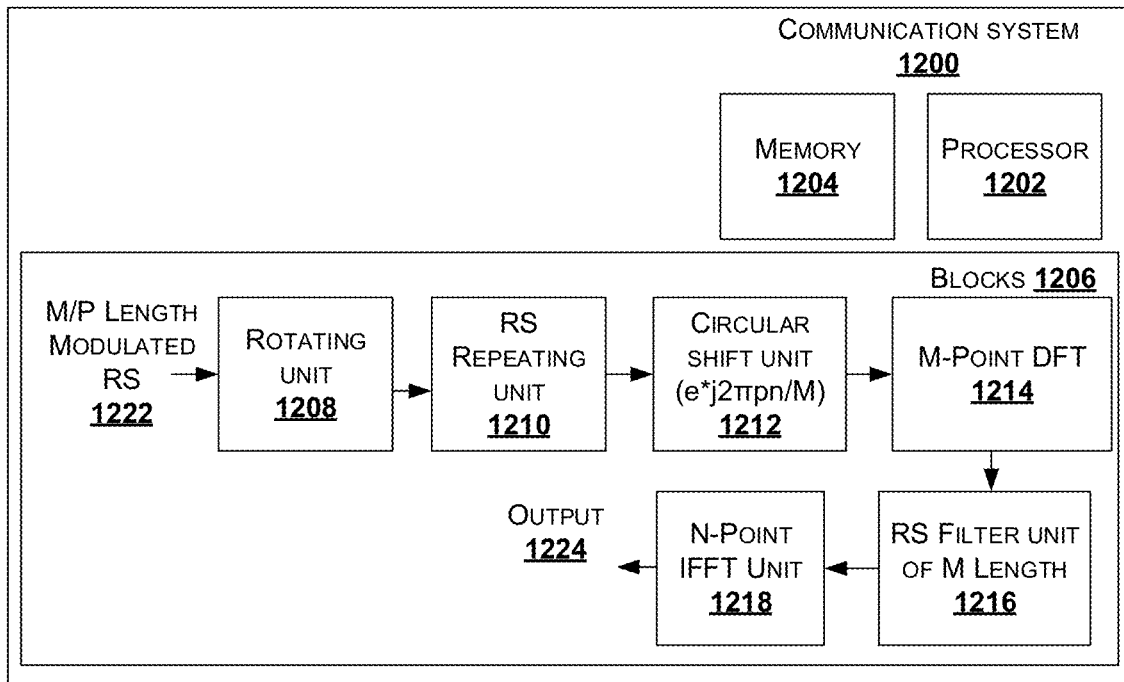
FIG. 12 shows a block diagram of a communication system for generating a RS with frequency domain spectrum shaping, in accordance with yet another alternative embodiment of the present disclosure.

FIG. 12 shows a block diagram of a communication system for generating a RS with spectrum shaping, in accordance with yet another alternative embodiment of the present disclosure.

As shown in FIG. 12, the communication system 1200 comprises a processor 1202, and memory 1204 coupled with the processor 1202. The communication system 1200 hereinafter referred as a transmitter. The processor 1202 may be configured to perform one or more functions of the communication system 1200 for generating reference sequences with low PAPR In one implementation, the communication system 1200 may comprise blocks 1206, also referred as modules or units for performing various operations in accordance with the embodiments of the present disclosure.

The blocks 1206 includes a rotating unit 1208, RS repeating unit 1210, a circular shift unit 1212, a M-point DFT 1214, RS Filter unit of M-length 1216 and an N-point inverse fast Fourier transform (IFFT) unit 1218. In an embodiment, the IFFT unit 1218 may be an inverse DFT.

The transmitter 1200 generates RS such that PAPR RS is maintained irrespective of antenna port it is mapped. For example, creating a length M RS, i.e. DMRS sequence using a length M/P by repeating the M/P length sequence P times, where P is the total number of DMRS ports configured:

$$X1 = [X\ X\ \ldots, P\ \text{times}]$$

The reference signal is rotated using rotating unit 1208. Considering a M/P length DMRS sequence and generating a M length sequence by repeating M/P length DMRS sequence P times in time domain using RS repeating unit 1210, where P is the total number of ports configured or number of RS ports. The M/P length sequence may be a BPSK sequence or PSK sequence and P is total number of ports.

The circular shift unit 1212 multiplies the M length time domain sequence with complex exponential $$\left(e^{\frac{2\pi np}{M}}\right),$$

where p is the Port number and n is the time index from 0 to M−1, n=0, 1, 2, ..., M−1 to result in a circularly shifted frequency domain sequence.

The M-point DFT 1214 transforms the circularly shifted sequence into frequency domain sequence. M-length RS filter unit 1216 performing spectrum shaping of the transformed frequency domain RS by multiplying it with the frequency domain RS filter. In an embodiment, if the time domain RS filter is specified explicitly, then the frequency domain RS filter may be obtained by taking every pth coefficient from the M point DFT of the time domain RS filter and placing them in the locations which are multiples of P while the other locations are zero. P is the total number of ports configured. For example, if P=2 the frequency domain RS filter may be [x(0) 0 x(2) 0 x(4) 0 x(6) 0 x(8) 0 x(10) 0], where x(k) is DFT of time domain RS filter.

In an embodiment, if the time domain RS filter is specified explicitly, then the frequency domain RS filter may be obtained by taking every Pth coefficient from the M point DFT of the time domain RS filter, with first sample starting from p, where P is the total number of ports configured and p is the port number. For example, if P=2 the frequency domain RS filter may be [x(0) 0 x(2) 0 x(4) 0 x(6) 0 x(8) 0 x(10) 0] for port-0 and [0 x(1) 0 x(3) 0 x(5) 0 x(7) 0 x(9) 0 x(11)] for port-1, where x(k) is DFT of time domain RS filter.

In an embodiment, if the time domain RS filter is nor specified explicitly, then the frequency domain RS filter can be derived from the data filter by, computing a M point DFT of the time domain data filter to generate frequency domain DATA filter, down sampling the frequency domain data filter by P times, such that every Pth coefficient is collected starting from 0th coefficient to generate a M/P length frequency domain filter. Then, P−1 zeros are inserted between two consecutive samples of M/P length frequency domain filter to generate a M length frequency domain filter as shown in FIG. 10A For example, if P=2 the frequency domain RS filter may be [x(0) 0 x(2) 0 x(4) 0 x(6) 0 x(8) 0 x(10) 0], where x(k) is DFT of time domain data filter. Subcarrier mapping followed by IFFT and CP addition to generate RS 1124 i.e. DMRS with low PAPR.

Figure 13A:
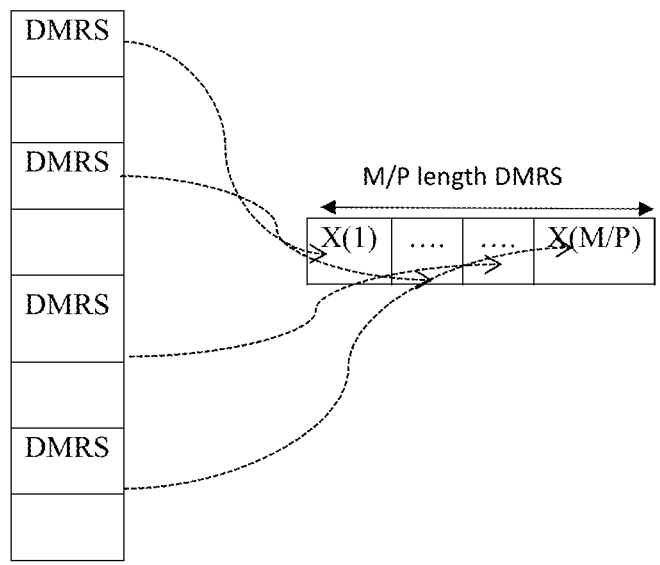
FIG. 13A shows an illustration of RS extraction from comb-x for channel estimation on comb-x, in accordance with an example embodiment of the present disclosure.

In an embodiment, if the time domain RS filter is nor specified explicitly, then the frequency domain RS filter can be derived from the data filter by, computing a M point DFT of the time domain data filter to generate frequency domain DATA filter, down sampling the frequency domain data filter by P times, such that every Pth coefficient is collected starting from the pth coefficient to generate a M/P length frequency domain filter. Where, P, p are total number of ports and port number respectively. Then, P−1 zeros are inserted between two consecutive samples of M/P length frequency domain filter to generate a M length frequency domain filter as shown in FIG. 10A. For example, if P=2 the frequency domain RS filter may be [x(0) 0 x(2) 0 x(4) 0 x(6) 0 x(8) 0 x(10) 0] for port-0 and [0 x(1) 0 x(3) 0 x(5) 0 x(7) 0 x(9) 0 x(11)] for port-1 respectively, where x(k) is DFT of time domain data filter. Subcarrier mapping followed by IFFT and CP addition to generate RS 1124 i.e. DMRS with low PAPR FIG. 13A shows DMRS extraction from port-x for channel estimation on port-x, in accordance with an embodiment of the present disclosure. In an embodiment, the channel estimation is performed by applying Least squares on extracted M/P DMRS sequence.

As shown in FIG. 13A, first step is extracting 'L' samples of the IDFT output, this captures an effective impulse response of the channel including the shaping response filter. For instance, if a channel tap length is "N" and filter length is "F", then L=N+F. If the channel length "N" is unknown, then a worst case value for "N" is chosen and then further processing is performed. Thereafter, applying M-point DFT on the extracted "L" length impulse response to generate M-length frequency domain channel estimates.

Figure 13B:
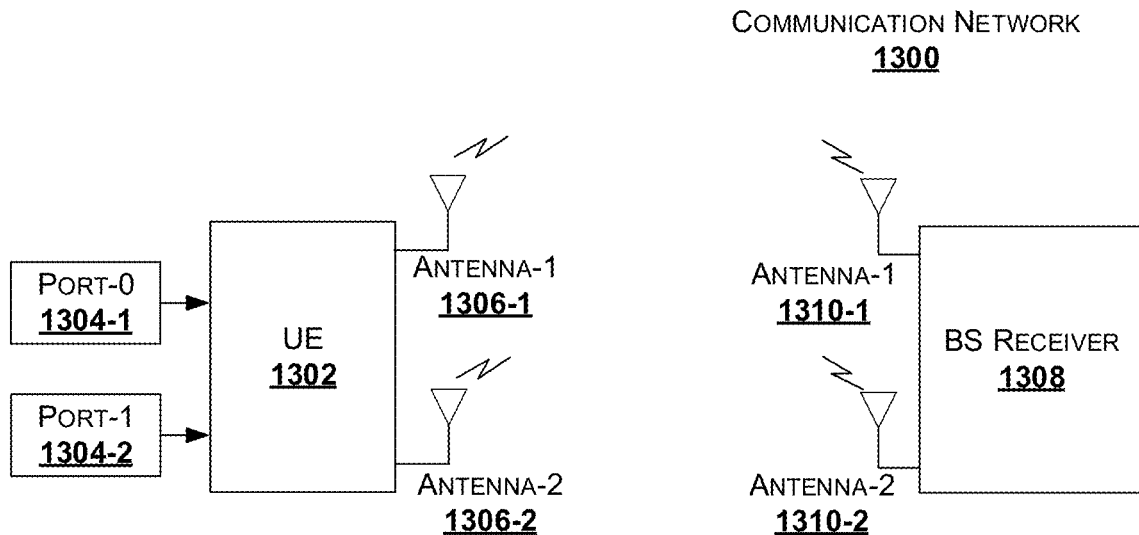
FIG. 13B shows a block diagram of a single user Multiple input multiple output (SU-MIMO) communication network, in accordance with an example embodiment of the present disclosure.

FIG. 13B shows a block diagram of a single user Multiple input multiple output (SU-MIMO) communication network, in accordance with an example embodiment of the present disclosure.

As shown in FIG. 13B, the communication network 1300 comprises a single user i.e. user equipment (UE) 1302 having two logical ports port-0 1304-1 and port-1 1304-2 and two antennas antenna 1 1306-1 and antenna 2 1306-2, and a base station (BS) receiver 1308. The BS receiver comprises two antennas antenna-1 1310-1 and antenna-2 1310-2. For example, in an embodiment, if the UE 1302 selects the port-0 1304-1 for transmission then, the UE transmits one of the RS and date using a corresponding antenna-1 1306-1. The BS receiver 1308 receives using a corresponding antenna 1310-1.

Figure 13C:
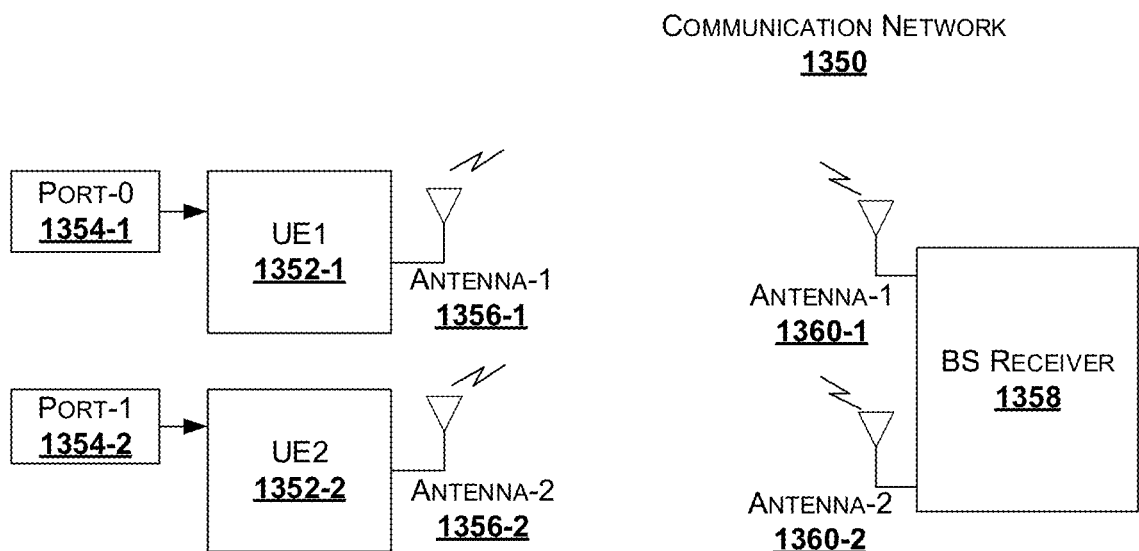
FIG. 13C shows a block diagram of a multi user Multiple input multiple output (MU-MIMO) communication network, in accordance with an example embodiment of the present disclosure.
Figure 14A:
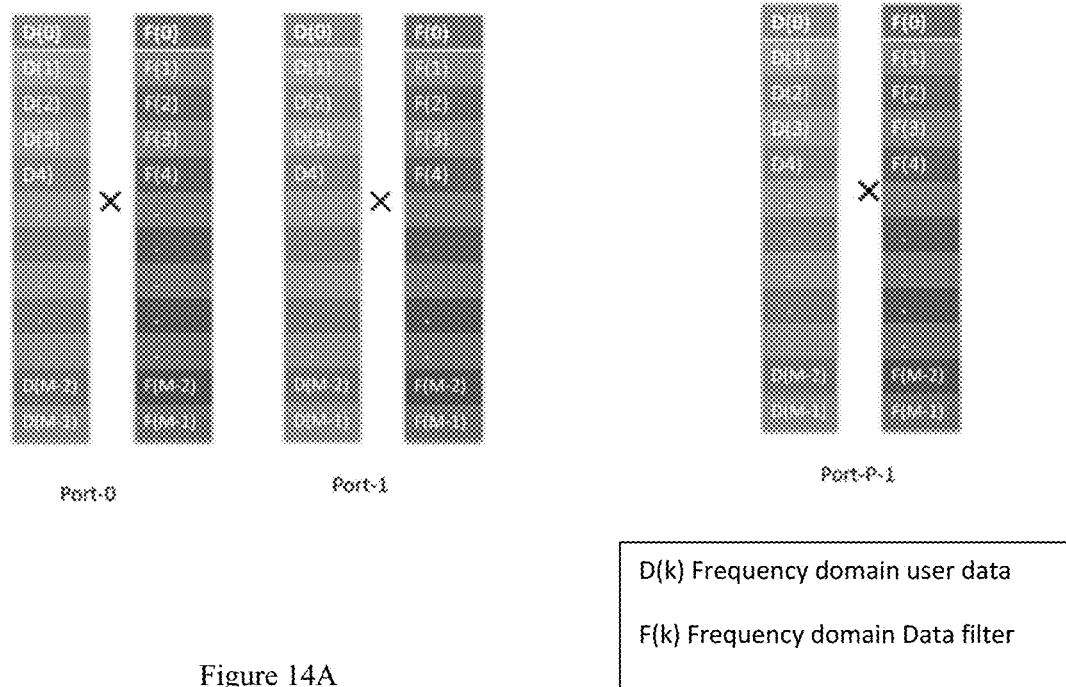
FIGS. 14A to 14F shows RS extraction from comb-x for channel estimation on comb-x, in accordance with another example embodiment of the present disclosure.
Figure 14B:
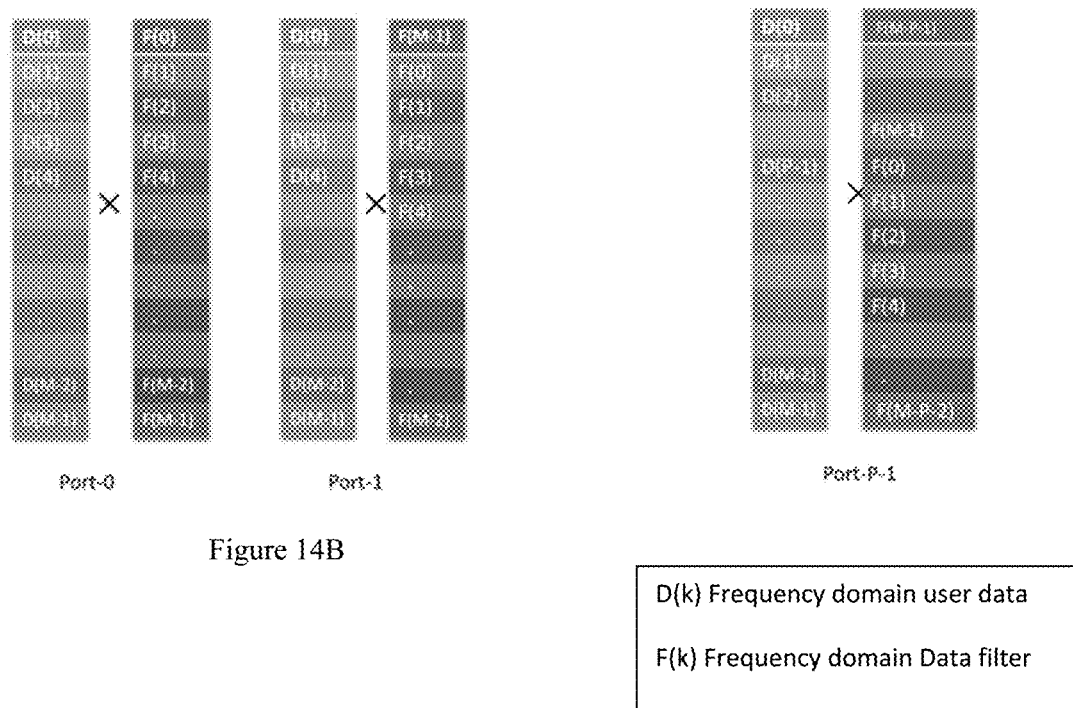
Figure 14C:
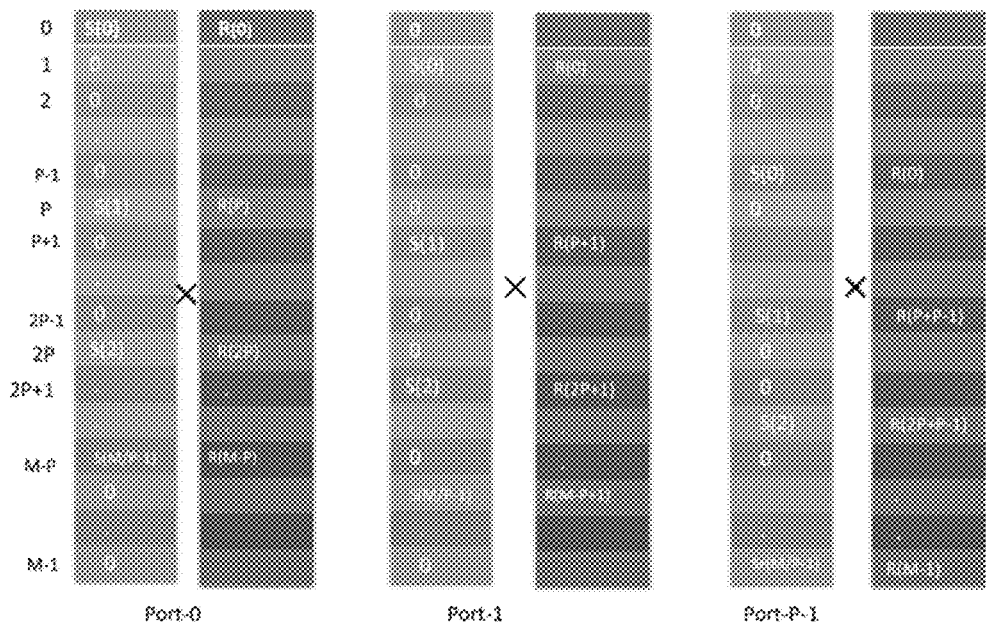
Figure 14D:
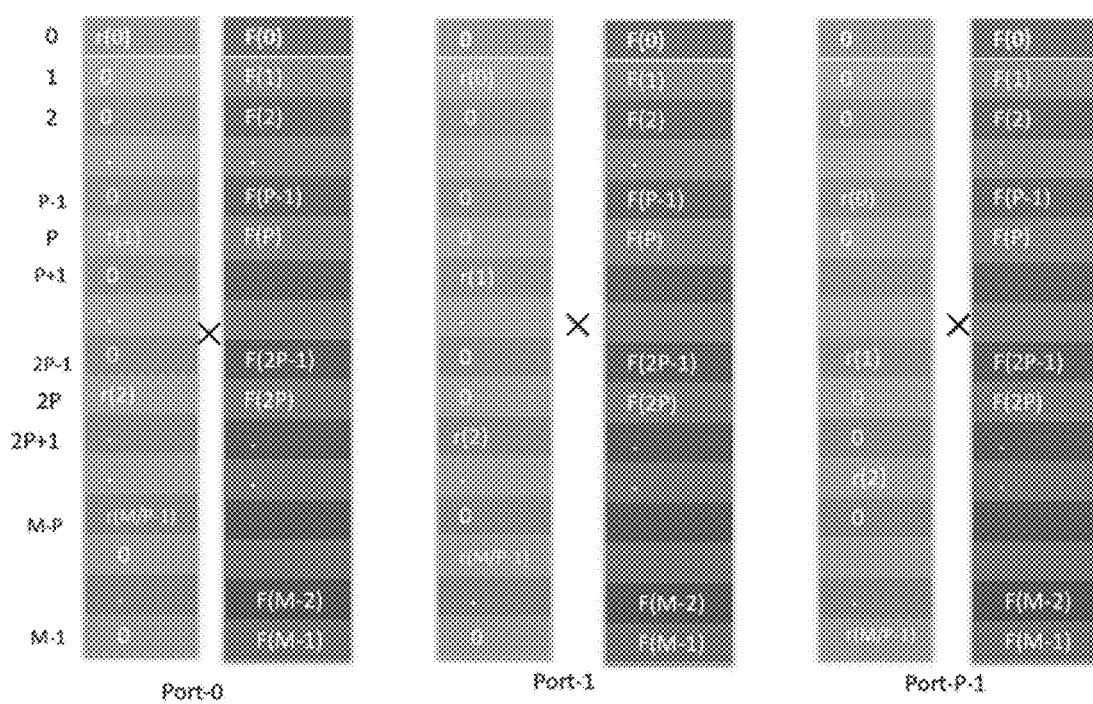
Figure 14E:
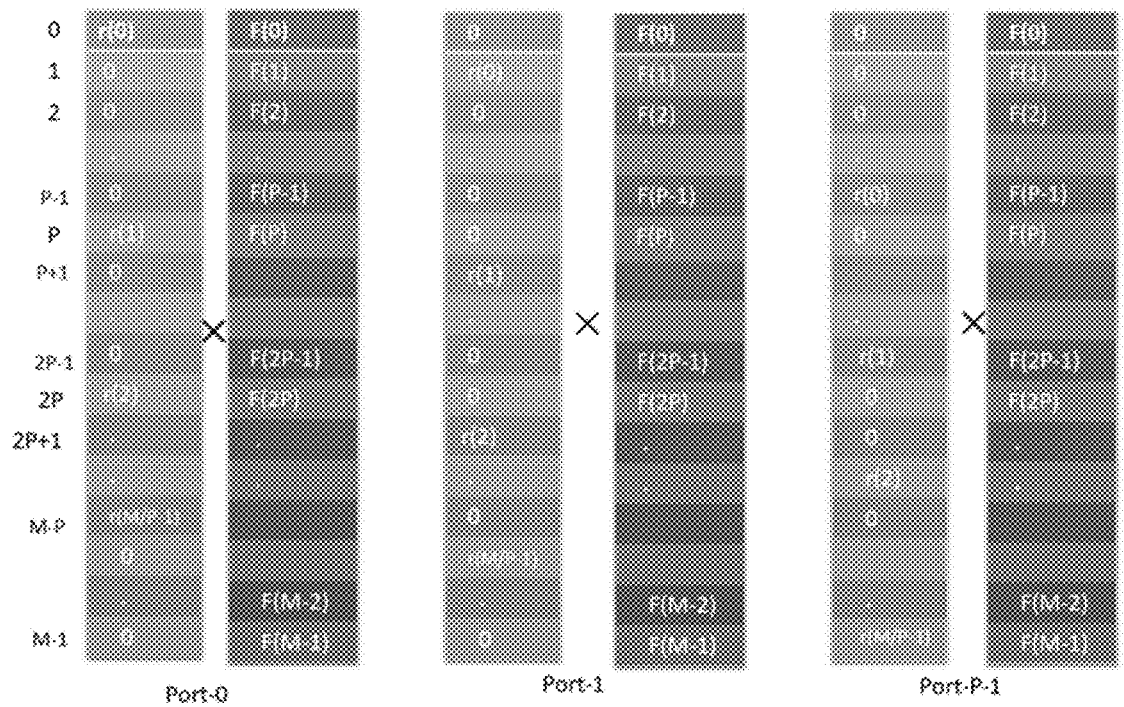
Figure 14F:
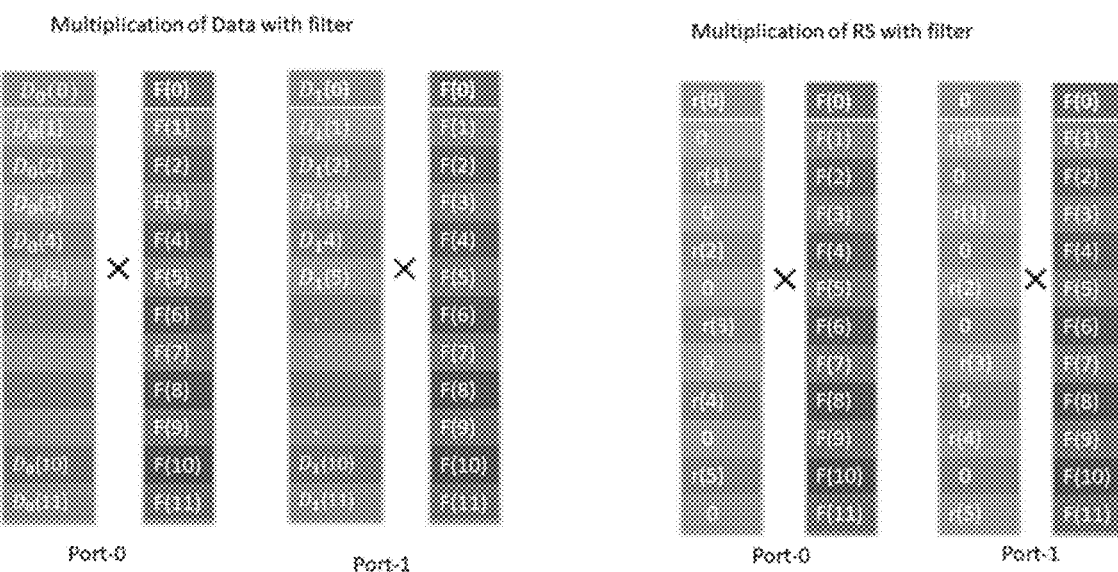

FIG. 13C shows a block diagram of a multi user Multiple input multiple output (MU-MIMO) communication network, in accordance with an example embodiment of the present disclosure.

As shown in FIG. 13C, the communication network 1350 comprises a two users, also referred as user equipment's (UE's), UE1 1352-1 and UE2 1352-2. The UE1 comprises a corresponding port port-0 1354-1 and an antenna 1356-1. Similarly, the UE2 comprises a corresponding port port-1 1354-2 and an antenna 1356-2. The communication network comprises a base station (BS) receiver 1358. The BS receiver comprises two antennas antenna-1 1360-1 and antenna-2 1360-2. In an embodiment for example, if the port-0 of UE-1 1352-1 is selected then the port-0 1354-1 for transmission then, the UE1 1352-1 transmits one of the RS and date using a corresponding antenna-1 1356-1. The BS receiver 1358 receives using a corresponding antenna 1360-1.

FIGS. 14A to 14F shows RS extraction from comb-x for channel estimation on comb-x, in accordance with another example embodiment of the present disclosure. The data filter and RS filter are configured for spectrum shaping can be signalled explicitly to each user through RRC messaging. If only either of Data or RS filter is specified, then the corresponding RS or Data filter can be derived.

For example, Data filters can be from the set $\{D_1, D_2\}$ where $D_1=[F(0), F(1), \ldots F(M-2), F(M-1)]$ is a M-point DFT of the time domain data filter.

$D_2=[F(M-p), F(M-p+1), \ldots F(0), \ldots F(M-p-1)]$ is a circularly shifted M-point DFT of the time domain data filter, p is the port number.

In another example, or the case of 2 Ports:

$$D_1=[F(0), F(1), \ldots F(M-2), F(M-1)]$$

$$D_2=[F(M-1), F(0), F(1) \ldots, F(M-2)]$$

DMRS filters may be from the set $\{R_1\ R_2\}$, where $$R_1 = [x\underbrace{(0)0}_{P}, \ldots 0,$$

$$\underbrace{x(P)0, \ldots \ldots \ldots}_{P} x(2P), \ldots \ldots \ldots, \ldots \ldots \underbrace{x(M-P)}_{P-1}, 0\ldots 0]$$

where x(k) is the M-point DFT of the RS filter and P is the total number of DMRS ports and p is port number $$R_2 = [0, \underbrace{0, \ldots}_{p-1} x(0), 0, 0, 0 \ldots \ldots, x(P), \ldots \ldots, x(M-P), \underbrace{0, 0\ldots}_{P-p-1} 0]$$

For the case of two ports $$R_1=[x(0)0, x(2)0x(4),0, \ldots x(M-2),0]$$

$$R_2=[0, x(0),0, x(2),0, x(4),0, \ldots x(M-2)]$$

Figure 15A:
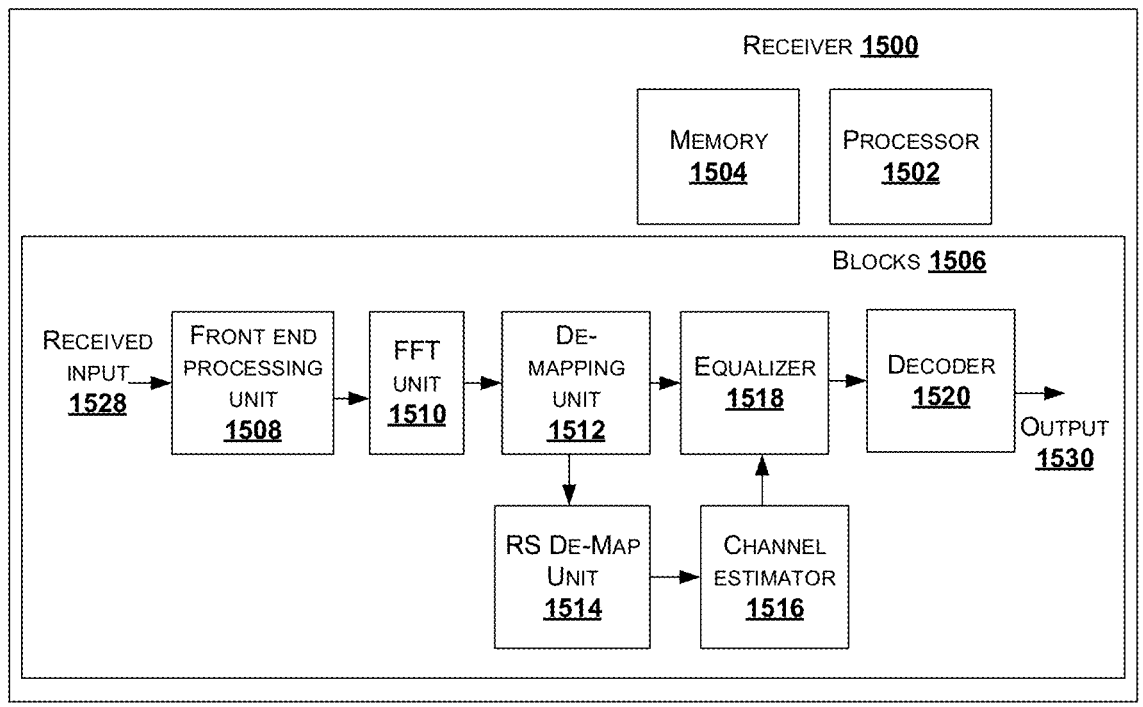
FIG. 15A shows a block diagram of a receiver for detecting received signal, in accordance with an embodiment of the present disclosure.

FIG. 15A shows a block diagram of a receiver for detecting received signal, in accordance with an alternate embodiment of the present disclosure.

As shown in FIG. 15A, the receiver includes a processor 1502 and memory 1504. The memory 1504 may be communicatively coupled to the processor 1502. The processor 1502 may be configured to perform one or more functions of the receiver for receiving data. In one implementation, the receiver may comprise various blocks 1506, also referred as units or modules, for performing various operations in accordance with the embodiments of the present disclosure.

The various blocks 1506 of the receiver 1500 includes front end processing unit 1508, CP removal unit, a fast Fourier transform (FFT) unit 1510, a subcarrier de-mapping unit 1512, a De-mapping unit 1514, also referred as de-mapper of DMRS per comb, an equalizer 1518, a channel estimator 1516, comb specific phase rotation unit and a decoder 1520.

As shown in FIG. 15A, the receiver 1500 detects a received input 1528 by performing a baseband processing, for demodulation data when DMRS is generated. The received input signal 1528 comprises at least one of data signal, reference signal (RS) and characteristics associated with a plurality of filters, said plurality of filters are data filter and RS filter.

The front end processing unit 1508 receives an input signal, referred as a received input or received input signal 1528, to remove a cyclic prefix from the received I-Q samples associated with the input signal 1528. The front end processing unit 1508 is also configured to convert the received input signal 1528 into a digital signal. The received input signal comprises at least one of data signal, reference signal (RS) and characteristics associated with a plurality of filters, said plurality of filters are data filter and RS filter.

The FFT unit 1510, also referred as discrete Fourier transform (DFT) unit, transform front end processed signal in to a frequency domain signal to produce transformed signal. The de-mapping unit 1512 performs de-mapping on the transformed signal on to one or more sub-carriers to obtain a de-mapped transformed signal. The RS de-mapping unit 1514 extracts M/P length reference sequence, for example DMRS in an example embodiment, from the de-mapped de-mapped transformed signal and subcarriers.

The channel estimator 1516, also referred as a channel estimation unit, performs channel estimation using the extracted M/P length reference sequence to compute channel estimates. In an embodiment, the channel estimate is obtained using one of the characteristics associated with the RS filter if explicitly indicated, and using the data filter and the RS filter if data filter is explicitly indicated. The equalizer 1518, also referred as an equalization unit, equalizes the channel on data symbols using the computed channel estimates. In an embodiment, the equalizer 1518 equalizes the de-mapped transformed sequence received from the de-mapping unit 1512 using estimated channel received from the channel estimator 1516 to generate equalized data sequence.

Figure 15B:
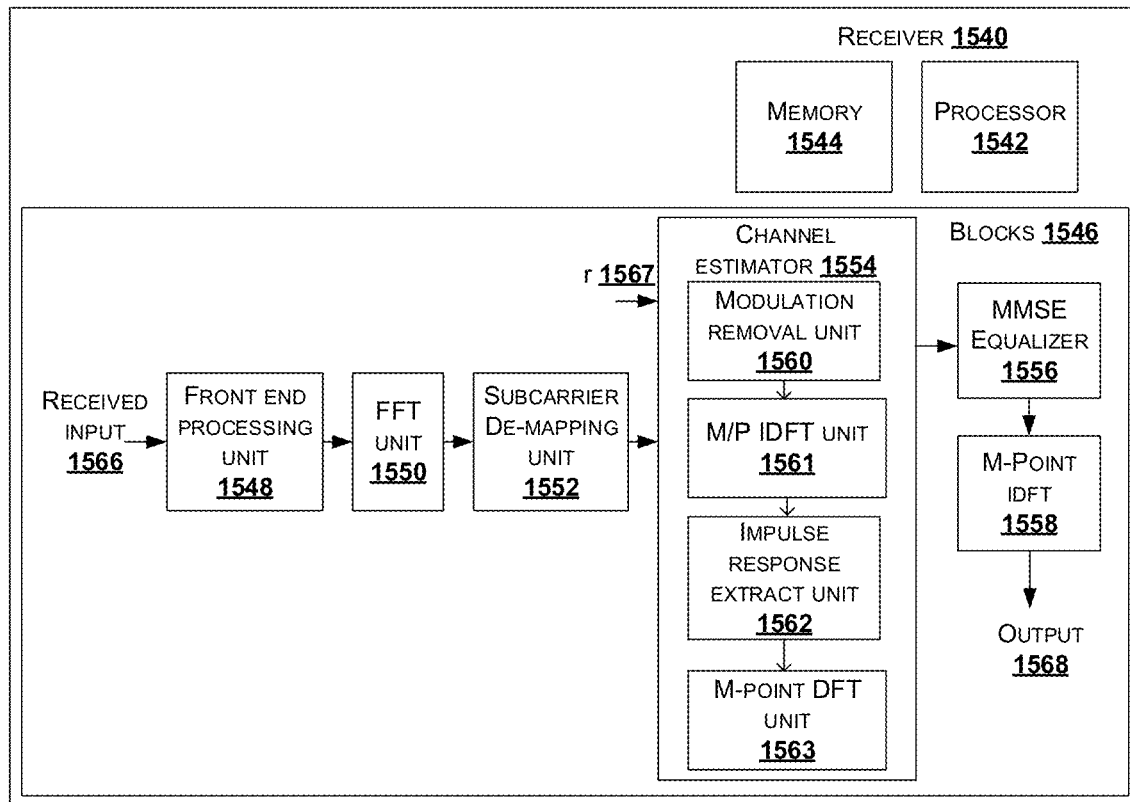
FIG. 15B shows a block diagram of a receiver for 2-layer single user multiple input multiple output (SU-MIMO) for detecting received signal, in accordance with an embodiment of the present disclosure.

FIG. 15B shows a block diagram of a receiver for 2-layer single user multiple input multiple output (SU-MIMO) for detecting received signal, in accordance with an embodiment of the present disclosure.

As shown in FIG. 15B, the receiver 1540 includes a processor 1542 and memory 1544. The memory 1544 may be communicatively coupled to the processor 1542. The processor 1542 may be configured to perform one or more functions of the receiver for receiving data. In one implementation, the receiver may comprise various blocks 1546, also referred as units or modules, for performing various operations in accordance with the embodiments of the present disclosure.

The various blocks 1546 of the receiver 1540 includes front end processing unit 1548, CP removal unit, a fast Fourier transform (FFT) unit 1550, a subcarrier de-mapping unit 1552, channel estimator 1554, MMSE equalizer 1556, and M-point IDFT 1558. The channel estimator 1554 comprises a modulation removal unit 1560, M/P point IDFT unit 1561, an impulse response extract unit 1562 and M-point DFT unit 1563.

As shown in FIG. 15B, the receiver 1540 detects a received input 1566, also referred as received input signal or input signal, in a single user multiple input multiple output (SU-MIMO). The received input signal 1566 comprises at least one of data signal, reference signal (RS) and characteristics associated with a plurality of filters, said plurality of filters are data filter and RS filter.

Figure 15C:
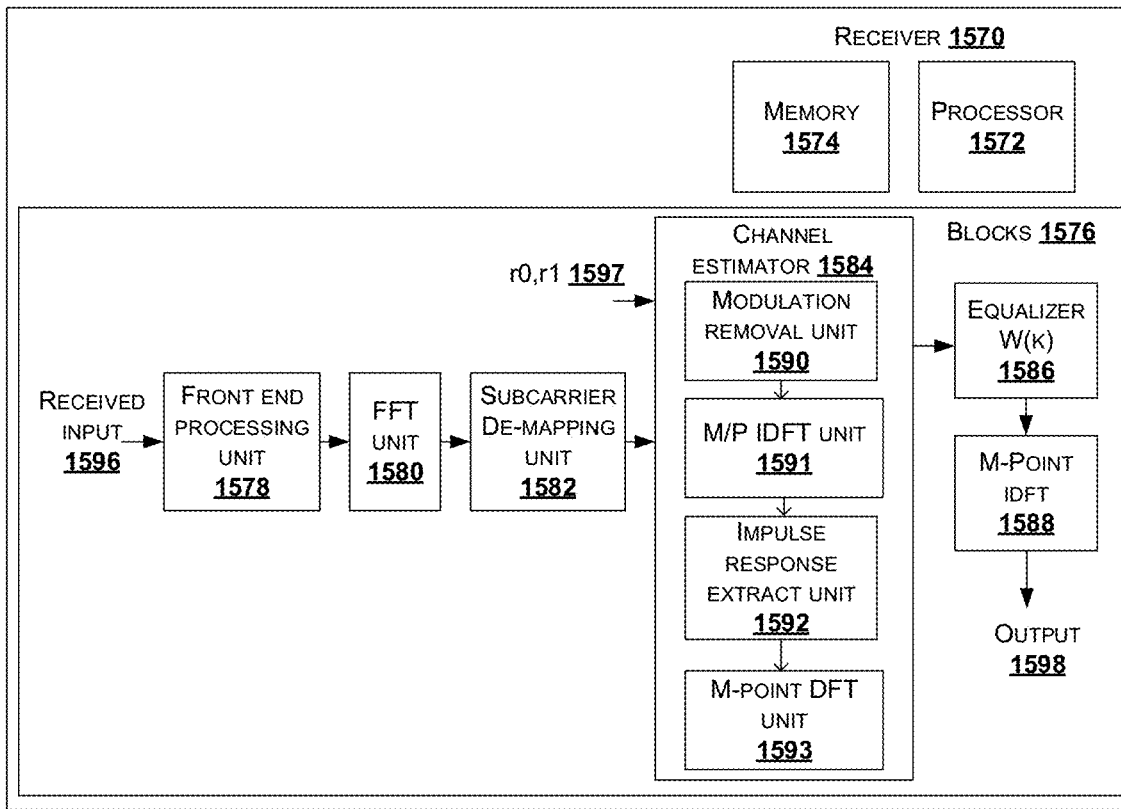
FIG. 15C shows a block diagram of a receiver for 2-layer multi user multiple input multiple output (MU-MIMO) for detecting received signal, in accordance with an embodiment of the present disclosure.

FIG. 15C shows a block diagram of a receiver for 2-layer multi user multiple input multiple output (MU-MIMO) for detecting received signal, in accordance with an embodiment of the present disclosure.

As shown in FIG. 15C, the receiver 1570 includes a processor 1572 and memory 1574. The memory 1544 may be communicatively coupled to the processor 1572. The processor 1572 may be configured to perform one or more functions of the receiver for receiving data. In one implementation, the receiver may comprise various blocks 1576, also referred as units or modules, for performing various operations in accordance with the embodiments of the present disclosure.

The various blocks 1576 of the receiver 1570 includes front end processing unit 1578, a fast Fourier transform (FFT) unit 1580, a subcarrier de-mapping unit 1582, a channel estimator 1584, an equalizer W(k) 1586, and M-point IDFT 1588. The channel estimator 1584 comprises modulation removal unit 1590, M/P point IDFT unit 1591, an impulse response extract unit 1592 and M-point DFT unit 1593.

In an embodiment, the receiver 1540 or 15770 decodes the received input 1566 or 1596 which is $$\frac{\pi}{2}$$

BPSK data symbols. The method of detecting input signal is common for both SU-MIMO and MU-MIMO. The receiver architecture is shown in FIGS. 15B and 15C. The front end processing unit 1548 or 1578 performs at least one of sampling, synchronization, and cyclic prefix (CP) removal. The FFT unit 1550 or 1580 transforms the front end processed signal from time domain to frequency domain. In an embodiment, ISI introduced by a propagation channel is considered to be less than that of the CP length. Therefore, after CP removal and FFT, the port-0, 1 DMRS signals on kth sub-carrier, k∈[0; M−1]) are represented using below equation:

$$y0_{DMRS}((k)=r_0(k)h_0(k)+v0(k)$$

$$y1_{DMRS}((k)=r_1(k)h_1(k)+v1(k)$$

where $r_0$, $r_1$ 1597 are the transmitted DMRS sequences on port-0, are port-1 respectively. The noise vectors v0 and $v_1$ are independent and identically distributed (i.i.d.) complex Gaussian random variables with zero-mean and co-variance $\sigma^2 I$, where 'I' is an identity matrix and $\sigma^2$ is a constant indicating the variance of each noise sample.

The subcarrier unit 1548 or 1578 performs sub-carrier mapping on the frequency domain data from the FFT unit to generated sub-carrier mapped data. As data is carried on M subcarriers, a data vector of length-M may be associated with M/2-length DMRS vector, the channel on all of these M subcarriers must be estimated for coherent demodulation. M-length frequency domain channel vector corresponding to M-length data symbol may be constructed from $$\frac{M}{2}$$

length DMRS sequence for both ports. The spectrum shaping is implementation specific and is generally unknown at the receiver. In an embodiment, the receiver has to estimate the impulse response of the spectrum shaping filter and wireless channel. A DFT-based channel estimation technique is used to estimate the joint channel response for the M allocated subcarriers.

The channel estimator 1554 or 1584, also referred as a channel estimation unit performs estimation of the channel. The channel estimation is performed on port-0 and port-1 comprising extracting the received DMRS symbols corresponding to each port by removing modulation using modulation removal unit 1560 or 1590. Next, generating time domain reference sequence corresponding to that port and computing $$\frac{M}{2}$$

point DFT using M/2-point DFT unit 1561 or 1591 on the generated time domain reference sequence to generated frequency domain reference sequence. Employing the extracted received DMRS sequence and the frequency domain reference sequence, perform a least squares based channel estimation followed with an $$\frac{M}{2}$$

point IDFT. This gives the joint impulse response of filter and the wireless channel $h_{eff}(n)$. A de-noising time domain filter is then applied to reduce noise. The filter f (n) is represented as $$f(n) = 1; 0 \le n \le fc - 1; M - fc \le n \le M - 1$$
$$= 0; \text{ otherwise}$$

where fc is the cut-off point, which is commonly chosen as the length of the wireless channel length if it is known a priori, otherwise it is set to the cyclic prefix length. The filtering extracts useful samples of the CIR by excluding the rest of the possible noise samples, in an embodiment.

The effective impulse response after de-noising is represented as:

$$\widetilde{h_{eff}}(n) = h_{eff}(n)f(n); 0 \le n \le M-1;$$

Lastly, the time domain filtered samples are transformed via an M-point DFT to recover the frequency-domain channel estimates on each subcarrier k∈[0; M−1]). The channel estimates may be further used for port-0 data demodulation using well-known techniques, in an embodiment.

The estimated channel on port-0 and port-1 are utilized for channel equalization of data streams. A frequency domain MMSE filter 1556 is used for the channel estimates obtained, is applied on the received signal samples from all the receive antennas of the base station to result in equalized data symbols. The equalized data symbols are demodulated to generate soft log-likelihood ratio values, which are inputted to the channel decoder module for subsequent bit-level processing i.e. inverse DFT using IDFT unit 1558 or 1598.

FIGS. 16A, 16B and 16C shows plots illustrating results of the frequency response, CCDF or PAPR values and BLER values respectively, in accordance with another example embodiment of the present disclosure.

When RS is received, channel is estimated by using the knowledge of the RS filter if explicitly indicated else the channel estimate includes the effect of the filter. The channel estimate is used for equalization of the data for data demodulation. If the data filter if explicitly indicated, the said channel estimate and data filter together will be used for equalization. The equalization procedure must also take into account the port being used for channel estimation and the appropriate filter, either with additional rotation based on port if required or not if not required must be performed properly.

FIG. 17 shows a flowchart illustrating a method of generating a signal by a transmitter, in accordance with some embodiments of the present disclosure.

As illustrated in FIG. 17, the method 1700 comprises one or more blocks for generating a signal in a communication system, having an optimized PAPR and optimized autocorrelation and cross-correlation. The method 1700 may be described in the general context of computer executable instructions. Generally, computer executable instructions can include routines, programs, objects, components, data structures, procedures, modules, and functions, which perform functions or implement abstract data types.

The order in which the method 1700 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 1710, filtering a discrete Fourier transform spread orthogonal frequency division multiplexing (DFT-s-OFDM) data signal, and one of a DFT-S-OFDM reference signal (RS) and orthogonal frequency division multiplexing (OFDM) RS is performed using a data filter and a RS filter respectively, to produce filtered data signal and filtered RS. The RS filter has one to one relationship with the data filter. The DFT-S-OFDM RS is generated using a reference sequence modulated by one of a pi/2 rotated Binary Phase Shift Keying (BPSK), 8 Phase Shift Keying (8-PSK), and Zadoff-Chu (ZC) sequence. The data signal is generated using a data sequence modulated by one of pi/2 Binary Phase Shift Keying (BPSK), Quadrature Phase Shift Keying (QPSK), and Quadrature Amplitude Modulation (QAM).

In an embodiment, the DFT-S-OFDM data signal by rotating a modulated data sequence. The modulated data sequence is a BPSK data sequence and a rotation is performed on consecutive samples of the data sequence by 90-degrees. The RS filter frequency domain coefficients comprises at least one of even subset of frequency domain coefficients corresponding to the data filter for a port number zero, and odd subset of frequency domain coefficients corresponding to the data filter for the port number one, for number of ports equal to two, in an embodiment.

At block 1720, port mapping the filtered RS is performed by a port mapping unit 310 to a corresponding port assigned to the transmitter to obtain port mapped filtered RS, wherein the port mapped filtered RS comprises a first subset of non-zero locations comprising of the filtered RS values and a second subset of zero locations comprising of zero values.

FIG. 18 shows a flowchart illustrating a method of generating waveform by a transmitter, in accordance with an alternative embodiments of the present disclosure.

As illustrated in FIG. 18, the method 1800 comprises one or more blocks for generating a waveform in a communication system. The generated waveform is having an optimized PAPR and optimized auto-correlation and cross-correlation. The method 1800 may be described in the general context of computer executable instructions. Generally, computer executable instructions can include routines, programs, objects, components, data structures, procedures, modules, and functions, which perform functions or implement abstract data types.

The order in which the method 1800 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 1810, rotating is performed on at least one modulated data and at least one modulated reference sequence (RS) to produce rotated modulated data and rotated modulated RS. This also includes generating at least one modulated data and at least one modulated reference sequence (RS) corresponding to a port of a base station. The modulation performed on the at least one data and at least one RS is one of binary phase shift keying (BPSK), 8-phase shift keying (PSK), quadrature amplitude modulation (QAM) and quaternary phase shift keying (QPSK). Length of the modulated data is M and length of the RS is M/P, where M is data sequence length, and P is number of ports.

The rotation operation is performed using the Pi/2 rotation unit 110, which performs constellation rotation on the received at least one sequence, wherein successive samples of the sequence are rotated by 90 degrees. The rotation unit 110 performs $j^k$ rotation on the input data 418 i.e., on the M-length BPSK sequence to generate a rotated data sequence. The rotation is performed on the M/P length RS to generate rotated RS, wherein M is data sequence length, and P is number of ports. The number of ports P is either pre-defined or explicitly indicated to the transmitter or a group of transmitters.

At block 1820, precoding is performed on the rotated modulated data and the rotated modulated RS using a data filter and a RS filter respectively, to produce a precoded data and precoded RS. In an embodiment, the data filter has one to one correspondence with the RS filter, where one of RS filter and data filter may be explicitly indicated to the transmitter. The RS filter is one of 1+D, 1−D, $0.26D^{-1}$+ 0.92+0.26D, and $-0.26D^{-1}$+0.92−0.26D, where D is a delay element. The data filter and RS filter are explicitly indicated to a receiver.

In an embodiment, the precoding is a circular convolution performed on the rotated modulated data and the rotated modulated RS in time domain using time domain data filter and time domain RS filter respectively. In an embodiment, the precoding of the rotated modulated RS is performed by the RS filter. The RS filter is derived from the data filter by applying M-point DFT on the data filter, down-sampling the output of M-point DFT by P values and by applying M/P-point IDFT to obtain the RS filter.

At block 1830, transforming the precoded data and the precoded RS using Discrete Fourier Transform (DFT) to generate transformed precoded data and transformed precoded RS. In an embodiment, the transforming may be performed using Fast Fourier Transform (FFT). In an embodiment, the precoded data is transformed from time domain into frequency domain using M-point DFT and precoded RS is transformed from time domain into frequency domain using M/P-point DFT.

At block 1840, port mapping the transformed precoded RS to a corresponding port of the transmitter to obtain port mapped transformed RS.

At block 1850, mapping is performed on the port mapped transformed RS and the transformed precoded data using a plurality of subcarriers to generate a sub-carrier mapped output.

At block 1860, generating a waveform is performed using Orthogonal Frequency Division Multiplexing (OFDM) modulation on the sub-carrier mapped output. Generating the waveform by performing OFDM modulation of the sub-carrier mapped output comprising performing an inverse Fast Fourier Transform (IFFT) on the sub-carrier mapped output to obtain time domain output and performing cyclic prefix (CP) operation on the time domain output to generate an output sequence. The generated waveform comprises at least one of optimized peak to average power ratio (PAPR), optimized cross correlation and optimized error-rate performance on every port of the transmitter.

FIG. 19 shows a flowchart illustrating a method of generating waveform by a transmitter, in accordance with yet another embodiments of the present disclosure.

As illustrated in FIG. 19, the method 1900 comprises one or more blocks for generating a waveform in a communication system. The generated waveform is having an optimized PAPR and optimized auto-correlation and cross-correlation. The method 1900 may be described in the general context of computer executable instructions. Generally, computer executable instructions can include routines, programs, objects, components, data structures, procedures, modules, and functions, which perform functions or implement abstract data types.

The order in which the method 1900 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 1910, rotating is performed on at least one modulated data and at least one modulated reference sequence (RS) to produce rotated modulated data and rotated modulated RS. This also includes generating at least one modulated data and at least one modulated reference sequence (RS) corresponding to a port of a base station. The modulation performed on the at least one data and at least one RS is one of binary phase shift keying (BPSK), 8-phase shift keying (PSK), quadrature amplitude modulation (QAM) and quaternary phase shift keying (QPSK). Length of the modulated data is M and length of the RS is M/P, where M is data sequence length, and P is number of ports.

The rotation operation is performed using the Pi/2 rotation unit 110, which performs constellation rotation on the received at least one sequence, wherein successive samples of the sequence are rotated by 90 degrees. The rotation unit 110 performs $j^k$ rotation on the input data 418 i.e., on the M-length BPSK sequence to generate a rotated data sequence. The rotation is performed on the M/P length RS to generate rotated RS, wherein M is data sequence length, and P is number of ports. The number of ports P is either pre-defined or explicitly indicated to the transmitter or a group of transmitters.

At block 1920, transforming the rotated modulated data and the rotated modulated RS using Discrete Fourier Transform (DFT) to generate transformed rotated modulated data and transformed rotated modulated RS. In an embodiment, the transforming may be performed using Fast Fourier Transform (FFT). In an embodiment, the rotated modulated data is transformed from time domain into frequency domain using M-point DFT and the rotated modulated RS is transformed from time domain into frequency domain using M/P-point DFT.

At block 1930, filtering the transformed rotated modulated RS and the transformed rotated modulated data using a RS filter and data filter to produce a filtered RS and filtered data respectively. In an embodiment, the data filter has one to one correspondence with the RS filter, where one of RS filter and data filter may be explicitly indicated to the transmitter. The RS filter is one of 1+D, 1−D, $0.26D^{-1}+0.92+0.26D$, and $-0.26D^{-1}+0.92-0.26D$, where D is a delay element. The data filter and RS filter are explicitly indicated to a receiver.

At block 1940, port mapping the filtered RS to a corresponding port of the transmitter to obtain port mapped transformed RS.

At block 1950, mapping is performed on the port mapped RS output and filtered data using a plurality of subcarriers to generate a sub-carrier mapped output.

At block 1960, generating a waveform is performed using Orthogonal Frequency Division Multiplexing (OFDM) modulation on the sub-carrier mapped output. Generating the waveform by performing OFDM modulation of the sub-carrier mapped output comprising performing an inverse Fast Fourier Transform (IFFT) on the sub-carrier mapped output to obtain time domain output and performing cyclic prefix (CP) operation on the time domain output to generate an output sequence. The generated waveform comprises at least one of optimized peak to average power ratio (PAPR), optimized cross correlation and optimized error-rate performance on every port of the transmitter.

FIG. 20 shows a flowchart illustrating a method of generating waveform by a transmitter, in accordance with an alternative embodiments of the present disclosure.

As illustrated in FIG. 20, the method 2000 comprises one or more blocks for generating a waveform in a communication system. The generated waveform is having an optimized PAPR and optimized auto-correlation and cross-correlation. The method 2000 may be described in the general context of computer executable instructions. Generally, computer executable instructions can include routines, programs, objects, components, data structures, procedures, modules, and functions, which perform functions or implement abstract data types.

The order in which the method 2000 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 2010, rotating is performed on at least one modulated data and at least one modulated reference sequence (RS) to produce rotated modulated data and rotated modulated RS. This also includes generating at least one modulated data and at least one modulated reference sequence (RS) corresponding to a port of a base station. The modulation performed on the at least one data and at least one RS is one of binary phase shift keying (BPSK), 8-phase shift keying (PSK), quadrature amplitude modulation (QAM) and quaternary phase shift keying (QPSK). Length of the modulated data is M and length of the RS is M/P, where M is data sequence length, and P is number of ports.

The rotation operation is performed using the Pi/2 rotation unit 110, which performs constellation rotation on the received at least one sequence, wherein successive samples of the sequence are rotated by 90 degrees. The rotation unit 110 performs $j^k$ rotation on the input data 418 i.e., on the M-length BPSK sequence to generate a rotated data sequence. The rotation is performed on the M/P length RS to generate rotated RS, wherein M is data sequence length, and P is number of ports. The number of ports P is either pre-defined or explicitly indicated to the transmitter or a group of transmitters.

At block 2020, performing repetition operation by a RS repetition unit 1010, configured in a communication system 1000 or a transmitter or a user equipment transmitter, on the rotated modulated RS to obtain a M-length rotated modulated RS.

At block 2030, precoding the rotated modulated data and the rotated modulated RS using a data filter and a RS filter respectively, to produce a precoded data and precoded RS. In an embodiment, the data filter has one to one correspondence with the RS filter, where one of RS filter and data filter may be explicitly indicated to the transmitter. The RS filter is one of 1+D, 1−D, $0.26D^{-1}+0.92+0.26D$, and $-0.26D^{-1}+0.92-0.26D$, where D is a delay element. The data filter and RS filter are explicitly indicated to a receiver.

In an embodiment, the precoding is a circular convolution performed on the rotated modulated data and the rotated modulated RS in time domain using time domain data filter and time domain RS filter respectively. In an embodiment, the precoding of the rotated modulated RS is performed by the RS filter.

At block 2040, transforming the precoded data and the precoded RS using Discrete Fourier Transform (DFT) to generate transformed precoded data and transformed precoded RS. In an embodiment, the transforming may be performed using Fast Fourier Transform (FFT). In an embodiment, the precoded data and the precoded RS is transformed from time domain into frequency domain using M-point DFT.

At block 2050, performing circular rotation on the transformed RS by p samples that correspond to a specific port p out of the total ports P to obtain port mapped transformed output.

At block 2060, mapping the port mapped transformed output using a plurality of subcarriers to generate a sub-carrier mapped output.

At block 2070, generating a waveform is performed using Orthogonal Frequency Division Multiplexing (OFDM) modulation on the sub-carrier mapped output. Generating the waveform by performing OFDM modulation of the sub-carrier mapped output comprising performing an inverse Fast Fourier Transform (IFFT) on the sub-carrier mapped output to obtain time domain output and performing cyclic prefix (CP) operation on the time domain output to generate an output sequence. The generated waveform comprises at least one of optimized peak to average power ratio (PAPR), optimized cross correlation and optimized error-rate performance on every port of the transmitter.

FIG. 21 shows a flowchart illustrating a method of generating waveform by a transmitter, in accordance with yet another embodiments of the present disclosure.

As illustrated in FIG. 21, the method 2100 comprises one or more blocks for generating a waveform in a communication system. The generated waveform is having an optimized PAPR and optimized auto-correlation and cross-correlation. The method 2100 may be described in the general context of computer executable instructions. Generally, computer executable instructions can include routines, programs, objects, components, data structures, procedures, modules, and functions, which perform functions or implement abstract data types.

The order in which the method 2100 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 2110, rotating is performed on at least one modulated data and at least one modulated reference sequence (RS) to produce rotated modulated data and rotated modulated RS. This also includes generating at least one modulated data and at least one modulated reference sequence (RS) corresponding to a port of a base station. The modulation performed on the at least one data and at least one RS is one of binary phase shift keying (BPSK), 8-phase shift keying (PSK), quadrature amplitude modulation (QAM) and quaternary phase shift keying (QPSK). Length of the modulated data is M and length of the RS is M/P, where M is data sequence length, and P is number of ports.

The rotation operation is performed using the Pi/2 rotation unit 110, which performs constellation rotation on the received at least one sequence, wherein successive samples of the sequence are rotated by 90 degrees. The rotation unit 110 performs $j^k$ rotation on the input data 418 i.e., on the M-length BPSK sequence to generate a rotated data sequence. The rotation is performed on the M/P length RS to generate rotated RS, wherein M is data sequence length, and P is number of ports. The number of ports P is either pre-defined or explicitly indicated to the transmitter or a group of transmitters.

At block 2120, performing repetition operation by a RS repetition unit 1110, configured in a communication system 1100 or a transmitter or a user equipment transmitter, on the rotated modulated RS to obtain a M-length rotated modulated RS.

At block 2130, transforming the rotated modulated data and the M-length rotated modulated RS using M-point Discrete Fourier Transform (DFT) to generate transformed data and transformed RS.

At block 2140, filtering the transformed modulated data and the transformed modulated RS using a RS filter and a data filter respectively, to produce a precoded data and precoded RS. The data filter is having one to one correspondence with the RS filter, where one of RS filter and data filter may be explicitly indicated to the transmitter. The RS filter is one of 1+D, 1−D, $0.26D^{-1}+0.92+0.26D$, and $-0.26D^{-1}+0.92-0.26D$, where D is a delay element. The data filter and RS filter are explicitly indicated to a receiver.

At block 2150, performing circular rotation on the filtered transformed RS by a port number p samples to obtain port mapped transformed output.

At block 2160, mapping the port mapped transformed output and filtered data using a plurality of subcarriers to generate a sub-carrier mapped output.

At block 2170, generating a waveform is performed using Orthogonal Frequency Division Multiplexing (OFDM) modulation on the sub-carrier mapped output. Generating the waveform by performing OFDM modulation of the sub-carrier mapped output comprising performing an inverse Fast Fourier Transform (IFFT) on the sub-carrier mapped output to obtain time domain output and performing cyclic prefix (CP) operation on the time domain output to generate an output sequence. The generated waveform comprises at least one of optimized peak to average power ratio (PAPR), optimized cross correlation and optimized error-rate performance on every port of the transmitter.

FIG. 22 shows a flowchart illustrating a method of generating waveform by a transmitter, in accordance with an alternative embodiments of the present disclosure.

As illustrated in FIG. 22, the method 2200 comprises one or more blocks for generating a waveform in a communication system. The generated waveform is having an optimized PAPR and optimized auto-correlation and cross-correlation. The method 2200 may be described in the general context of computer executable instructions. Generally, computer executable instructions can include routines, programs, objects, components, data structures, procedures, modules, and functions, which perform functions or implement abstract data types.

The order in which the method 2200 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 2210, rotating is performed on at least one modulated data and at least one modulated reference sequence (RS) to produce rotated modulated data and rotated modulated RS. This also includes generating at least one modulated data and at least one modulated reference sequence (RS) corresponding to a port of a base station. The modulation performed on the at least one data and at least one RS is one of binary phase shift keying (BPSK), 8-phase shift keying (PSK), quadrature amplitude modulation (QAM) and quaternary phase shift keying (QPSK). Length of the modulated data is M and length of the RS is M/P, where M is data sequence length, and P is number of ports.

The rotation operation is performed using the Pi/2 rotation unit 110, which performs constellation rotation on the received at least one sequence, wherein successive samples of the sequence are rotated by 90 degrees. The rotation unit 110 performs $j^k$ rotation on the input data 418 i.e., on the M-length BPSK sequence to generate a rotated data sequence. The rotation is performed on the M/P length RS to generate rotated RS, wherein M is data sequence length, and P is number of ports. The number of ports P is either pre-defined or explicitly indicated to the transmitter or a group of transmitters.

At block 2220, performing repetition operation by a RS repetition unit 1210, configured in a communication system 1200 or a transmitter or a user equipment transmitter, on the rotated modulated RS to obtain a M-length rotated modulated RS.

At block 2230, performing circular rotation, by the transmitter, on the M-length rotated modulated RS by multiplying with $$e^{\frac{j2\pi pn}{M}},$$

where p is the port number and n is the sample number to obtain port mapped modulated RS.

At block 2240, transforming the rotated modulated data and the port mapped modulated RS using M-point Discrete Fourier Transform (DFT) to generate transformed data and transformed RS. In an embodiment, the transforming may be performed using Fast Fourier Transform (FFT). In an embodiment, the precoded data and the precoded RS is transformed from time domain into frequency domain using M-point DFT.

At block 2250, filtering, by the transmitter, the transformed data and the transformed RS using a RS filter and a data filter respectively, to produce a filtered transformed data and filtered transformed RS.

At block 2260, mapping the filtered transformed data and filtered transformed RS using a plurality of subcarriers to generate a sub-carrier mapped output.

At block 2270, generating a waveform is performed using Orthogonal Frequency Division Multiplexing (OFDM) modulation on the sub-carrier mapped output. Generating the waveform by performing OFDM modulation of the sub-carrier mapped output comprising performing an inverse Fast Fourier Transform (IFFT) on the sub-carrier mapped output to obtain time domain output and performing cyclic prefix (CP) operation on the time domain output to generate an output sequence. The generated waveform comprises at least one of optimized peak to average power ratio (PAPR), optimized cross correlation and optimized error-rate performance on every port of the transmitter.

Further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

A description of an embodiment with several components in communication with each other does not imply that all such components are required. On the contrary a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description. Accordingly, the disclosure of the embodiments of the invention is intended to be illustrative, but not limiting, of the scope of the invention.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A method for generating a signal in a communication network, the method comprising:
    filtering, by a transmitter, a discrete Fourier transform spread orthogonal frequency division multiplexing (DFT-s-OFDM) data signal using a data filter to generate a filtered data signal;
    filtering, by the transmitter, a DFT-S-OFDM reference signal (RS) using a RS filter to generate a filtered RS, wherein the RS filter has a one-to-one relationship with the data filter; and
    port mapping, by the transmitter, the filtered RS to a corresponding port assigned to the transmitter to obtain a port mapped filtered RS, wherein the port mapped filtered RS comprises a first subset of locations comprising the filtered RS values and a second subset of locations, each with a value of zero.

2. The method of claim 1, comprising:
    generating the DFT-S-OFDM RS using a reference sequence modulated by $\pi/2$ rotated Binary Phase Shift Keying (BPSK).

3. The method of claim 1, comprising:
    generating the DFT-S-OFDM RS using a reference sequence modulated by a Zadoff-Chu (ZC) sequence.

4. The method of claim 1, comprising:
    generating the DFT-s-OFDM data signal using a data sequence modulated by $\pi/2$ BPSK.

5. The method of claim 1, comprising:
    generating the DFT-s-OFDM data signal by rotating a modulated data sequence.

6. The method of claim 5, wherein the modulated data sequence is a BPSK data sequence.

7. The method of claim 5, wherein the rotation is performed on consecutive samples.

8. The method of claim 5, wherein the rotation is sequentially incremented by 90°.

9. The method of claim 1, comprising:
    indicating characteristics of one of the RS filter and the data filter to a receiver.

10. The method of claim 1, wherein a time domain impulse response of the RS filter is equal to a time domain impulse response of the data filter.

11. A system for generating a signal in a communication network, the system comprising:
    a data filter to generate a filtered data signal from a discrete Fourier transform spread orthogonal frequency division multiplexing (DFT-s-OFDM) data signal;
    a reference signal (RS) filter to generate a filtered RS from a DFT-S-OFDM RS, wherein the RS filter has a one-to-one relationship with the data filter; and
    a transmitter to port map the filtered RS to an assigned port to obtain a port mapped filtered RS, wherein the port mapped filtered RS comprises a first subset of locations comprising the filtered RS values and a second subset of locations, each with a value of zero.

12. The system of claim 11, wherein the DFT-S-OFDM RS comprises a reference sequence modulated by π/2 rotated Binary Phase Shift Keying (BPSK).

13. The system of claim 11, wherein the DFT-S-OFDM RS comprises a reference sequence modulated by a Zadoff-Chu (ZC) sequence.

14. The system of claim 11, wherein the DFT-s-OFDM data signal comprises a data sequence modulated by π/2 BPSK.

15. The system of claim 11, wherein the DFT-s-OFDM data signal comprises a data sequence that is modulated and rotated.

16. The system of claim 15, wherein the data sequence is BPSK modulated.

17. The system of claim 15, wherein the rotation is performed on consecutive samples.

18. The system of claim 15, wherein the rotation is sequentially incremented by 90°.

19. The system of claim 11, wherein the transmitter is configured to indicate characteristics of one of the RS filter and the data filter to a receiver.

20. The system of claim 11, wherein a time domain impulse response of the RS filter is equal to a time domain impulse response of the data filter.

* * * * *